United States Patent
Kumar et al.

(10) Patent No.: US 8,538,740 B2
(45) Date of Patent: Sep. 17, 2013

(54) REAL-TIME PERFORMANCE MODELING OF SOFTWARE SYSTEMS WITH MULTI-CLASS WORKLOAD

(75) Inventors: Dinesh Kumar, Hawthorne, NY (US); Asser N. Tantawi, Hawthorne, NY (US); Li Zhang, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/579,124

(22) Filed: Oct. 14, 2009

(65) Prior Publication Data

US 2011/0087469 A1    Apr. 14, 2011

(51) Int. Cl.
G06F 17/10 (2006.01)
G06F 9/50 (2006.01)
G06F 15/173 (2006.01)
G06F 11/30 (2006.01)

(52) U.S. Cl.
USPC ............. 703/22; 703/2; 709/224; 702/182; 702/183

(58) Field of Classification Search
USPC ........................................ 703/22; 706/14, 19
See application file for complete search history.

(56) References Cited

U.S. PATENT DOCUMENTS

| | | | |
|---|---|---|---|
| 6,393,480 B1 * | 5/2002 | Qin et al. | 709/224 |
| 6,622,221 B1 * | 9/2003 | Zahavi | 703/22 |
| 6,757,579 B1 * | 6/2004 | Pasadyn | 700/29 |
| 6,789,050 B1 * | 9/2004 | Reeser et al. | 703/2 |
| 6,807,583 B2 | 10/2004 | Hrischuk et al. | |
| 8,010,337 B2 * | 8/2011 | Narayanan et al. | 703/22 |
| 8,140,319 B2 * | 3/2012 | Wasser | 703/22 |
| 8,140,673 B2 * | 3/2012 | Diao et al. | 709/224 |
| 2002/0099282 A1 * | 7/2002 | Knobbe et al. | 600/365 |
| 2003/0233220 A1 * | 12/2003 | Ignatowski et al. | 703/22 |
| 2004/0148152 A1 * | 7/2004 | Horikawa | 703/22 |
| 2006/0029016 A1 | 2/2006 | Peles | |
| 2006/0074558 A1 * | 4/2006 | Williamson et al. | 701/213 |
| 2006/0167784 A1 * | 7/2006 | Hoffberg | 705/37 |
| 2006/0294044 A1 | 12/2006 | Karlsson et al. | |
| 2007/0022327 A1 | 1/2007 | Otsuka et al. | |
| 2007/0078641 A1 * | 4/2007 | Bank et al. | 703/22 |
| 2007/0083500 A1 | 4/2007 | Zibitsker | |
| 2007/0087756 A1 | 4/2007 | Hoffberg | |
| 2008/0109390 A1 * | 5/2008 | Iszlai et al. | 706/14 |
| 2008/0133608 A1 | 6/2008 | Brown et al. | |

(Continued)

FOREIGN PATENT DOCUMENTS

JP    2004220453 A    8/2004

OTHER PUBLICATIONS

"Model Predictive Control Design: New Trends and Tools" by Alberto Bemporad (Dec. 13-15, 2006, pp. 6678-6683), IEEE.*

(Continued)

Primary Examiner — Akash Saxena
(74) Attorney, Agent, or Firm — Cantor Colburn LLP; Preston Young

(57) ABSTRACT

Methods and systems for determining a real-time performance model of systems that process multi-class workloads. The methods can include collecting measurement data, selecting a series of prior time windows, processing the measurement data to compute a set of constraints based on the measurement data from the series of prior time windows, augmenting the set of constraints to a measurement model to obtain an augmented measurement model and running a modified extended Kalman filter with the augmented measurement model to obtain a state estimate.

14 Claims, 15 Drawing Sheets

(56) References Cited

U.S. PATENT DOCUMENTS

| | | | |
|---|---|---|---|
| 2008/0294308 A1* | 11/2008 | Watson | 701/21 |
| 2009/0006069 A1 | 1/2009 | Alam et al. | |
| 2009/0119301 A1 | 5/2009 | Cherkasova et al. | |
| 2010/0332210 A1* | 12/2010 | Birdwell et al. | 703/22 |
| 2011/0087469 A1* | 4/2011 | Kumar et al. | 703/2 |

OTHER PUBLICATIONS

Real-time performance modeling for adaptive software systems with multi-class workload; Kumar, D. ; Tantawi, A. ; Li Zhang Modeling, Analysis & Simulation of Computer and Telecommunication Systems, 2009. MASCOTS '09. IEEE International Symposium on Digital Object Identifier: 10.1109/MASCOT.2009.5366166, Publication Year: 2009 , pp. 1-4.*

Application Response Measurement—ARM, [online]; [retrieved on Oct. 12, 2009]; retrieved from the Internet http://www.opengroup.org/tech.management/arm/, p. 1 of 1.

R. Badrinath, Abhijit Mitra, Nishant Sinha, et al., Real-time performance modeling of (3G) UMTS system, SPIE COnference Proceedings, Published: Nov. 2, 2001, pp. 1-11.

Chen, W.K., Hiltunen, M.A., Schlichting, R.D.: Constructing adaptive software in distributed systems. In: Proceedings of the 21st International Conference on Distributed Computing Systems, IEEE Computer Society (2001) 635-643.

Liu, Z., Xia, C.H., Momcilovic, P., Zhang, L.: AMBIENCE: Automatic Model Building using InferEnce. In: Congress MSR03, Metz, France (Oct. 2003), pp. 1-18.

Oh, S., J-H. Kim, and G. Fox, Real-Time Performance Analysis for Publish/Subscribe Systems, Bloomington, IN, Indiana University, Oct. 20, 2008, pp. 1-11.

Pacifici, G., Spreitzer, M., Tantawi, A., Youssef, A.: Performance management for cluster based web services. IEEE Journal on Selected Areas in Communications 23(12) (Dec. 2005) 2333-2343.

Solomon, B., Ionescu, D., Litoiu, M., Mihaescu, M.: A real-time adaptive control of autonomic computing environments. In: CASCON'07: Proceedings of the 2007 conference of the center for advanced studies on Collaborative research. (2007) 124-136.

Urgaonkar, B., Pacifici, G., Shenoy, P., Spreitzer, M., Tantawi, A.: Analytic modeling of multitier internet applications. ACM Transactions on the Web 1(1) (May 2007) 1-35.

Woodside, M., Zheng, T., Litoiu, M.: The use of optimal filters to track parameters of performance models. In: QEST '05: Proceedings of the Second International Conference on the Quantitative Evaluation of Systems, Torino, Italy (Sep. 2005), pp. 1-10.

Zhang, L., Liu, Z., Riabov, A., Schulman, M., Xia, C., Zhang, F.: A comprehensive toolset for workload characterization, performance modeling, and online control. Computer Performance Evaluations, Modelling Techniques and Tools (Springer-Verlag LNCS) 2794 (2003) 63-77.

Zhang, L., Xia, C., Squillante, M., III, W.M.: Workload Service Requirements Analysis: A Queueing Network Optimization Approach. In: 10th IEEE International Symposium on Modeling, Analysis, and Simulation of Computer and Telecommunications Systems (MASCOTS). (2002), pp. 1-10.

Zheng, T., Yang, J., Woodside, M., Litoiu, M., Iszlai, G.: Tracking timevarying parameters in software systems with extended kalman filters. In: CASCON '05: Proceedings of the 2005 conference of the Centre for Advanced Studies on Collaborative research, IBM Press (Oct. 2005) 334-345.

Zheng, T., Woodside, M., Litoiu, M.: Performance model estimation and tracking using optimal filters. IEEE Transactions on Software Engineering 34(3) (May-Jun. 2008) 391-406.

Alberto Bemporad, 'Model Predictive Control Design: New Trends and Tools', Proceedings of the 45th IEEE Conference on Decision & Control, San Diego, CA, USA, Dec. 13-15, 2006, pp. 6678-6683.

Hamann et al., 'A Model-Driven Approach for Developing Adaptive Software Systems', IFIP International Federation for Information Processing 2008, R. Meier and S. Terzis (Eds.): DAIS 2008, LNCS 5053, pp. 196-209.

Ionescu et al., 'A Robust Autonomic Computing Architecture for Server Virtualization': INES 2008, 12th International Conference on Intelligent Engineering Systems, Feb. 25-29, 2008 Miami, Florida, pp. 173-180.

Pacifici et al., 'CPU demand for web serving: Measurement analysis and dynamic estimation', Performance Evaluation 65 (2008) 531-553.

Woodside et al., 'Service System Resource Management Based on a Tracked Layered Performance Model', ICAC'06: Proceedings of the Third International Conference on Autonomic Computing, IEEE Press (Jun. 2006), pp. 175-184.

* cited by examiner

REAL-TIME PERFORMANCE MODELING OF SOFTWARE SYSTEMS WITH MULTI-CLASS WORKLOAD

BACKGROUND

The present invention relates to real-time performance modeling, and more specifically, to methods and systems for determining real-time performance models of systems that process multi-class workloads.

Current software systems continuously self-reconfigure their components to adapt to run-time changes in the host and network environments. In particular, Internet based online applications operate in a highly dynamic environment with fast changing user workloads and browsing patterns. Changes may also occur in the virtualized system platform that runs the software application. In an e-commerce based online shopping system, processed user workload may include authentication transactions such as login and business transactions such as browsing a catalog, searching for products, adding items to a shopping cart, and proceeding to check out. Each of these transactions uses the e-commerce server's resources differently and can be classified into different classes.

The quality of a software system is often measured in terms of its performance, which can be for example, end to end response time from a user's point of view. A performance model of a system can be used for predictive analysis of the system, (e.g., for response time prediction at hypothetical workloads). Performance models of an adaptive software (AS) system, for example, can be useful for autonomic control, if they are updated in real-time to reflect the changes in the software system parameters. However, performance modeling of an AS system has drawbacks. For example, classical queueing theory based performance models require the knowledge of parameters such as service times and network queueing delays for different classes of transactions. These parameters are used to compute and predict performance metrics such as average transaction response time, average number of jobs/transactions waiting to be processed, and the like. There are existing techniques that implement simulations and manual calibrations to compute similar performance metrics. However, none of these techniques can be practically applied if the service times and network queueing delays are unknown. Instrumentating software applications with probes in order to actually measure the service time and delay parameters can be intrusive, requires extensive manual coding and can be time consuming. In addition, the source code of a standard, commercialized e-commerce software system may not even be accessible. Moreover, instrumentation is an iterative procedure and is difficult to pursue in a dynamically changing environment, which is often the case for an AS system that undergoes continuous changes that can lead to time-varying service times and delays. These system parameters must therefore be estimated using only readily available measurement data. Other approaches implement inferencing algorithms to estimate a service time and network queueing delay based performance model. Inferencing allows one to compute the service time and delay parameters from readily available measurement data on end-to-end response times, CPU utilizations and workload arrival rates. Inferencing however models service time and delay using stationary model parameters and cannot be used for AS systems with time-varying parameters.

Performance models can play an important role in accurately driving the necessary dynamic changes in an AS system. For instance, at runtime, software systems can better adapt to the changes in execution environment if an underlying performance model of the system is known. A performance model updated in real-time can be combined with model predictive control to achieve autonomic control of a software system. FIG. 1 illustrates an example of the autonomic control architecture of an AS system. Reliable and optimal control of a software system in order to achieve the desired objective is critically dependent on the service time and network queueing delay model parameters that characterize the system. Robust control can only be achieved if the system model parameters accurately reflect the changes in the software system at runtime. Since autonomic control of a software system may lead to reconfiguration of the software architecture at run-time, the underlying model parameters may not remain constant and can vary with time. It is thus important to accurately track the time-varying model parameters of an AS system in real-time.

SUMMARY

Exemplary embodiments include a method for determining a real-time performance model of a system that processes multi-class workloads, the method including, collecting measurement datum at a time step k, selecting N prior time windows, processing the measurement datum to compute a set of constraints based on the measurement data from the N prior time windows, augmenting the set of constraints to a measurement model to obtain an augmented measurement model, running a modified extended Kalman filter (EKF) with the augmented measurement model to obtain a state estimate and incrementing the time step k.

Additional exemplary embodiments include a method for determining a real-time performance model of a system that processes multi-class workloads, the method including collecting measurement data, selecting a series of prior time windows, processing the measurement data to compute a set of constraints based on the measurement data from the series of prior time windows, augmenting the set of constraints to a measurement model to obtain an augmented measurement model and running a modified extended Kalman filter with the augmented measurement model to obtain a state estimate.

Further exemplary embodiments include a computer program product for determining a real-time performance model of a system that processes multi-class workloads, the computer program product including instructions for causing a performance modeling computer, having a processor and a memory communicatively coupled to the processor, to implement a method, the method including collecting measurement data in the memory, selecting a series of prior time windows, processing the measurement data to compute a set of constraints based on the measurement data from the series of prior time windows, augmenting the set of constraints to a measurement model to obtain an augmented measurement model and running a modified extended Kalman filter with the augmented measurement model to obtain a state estimate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
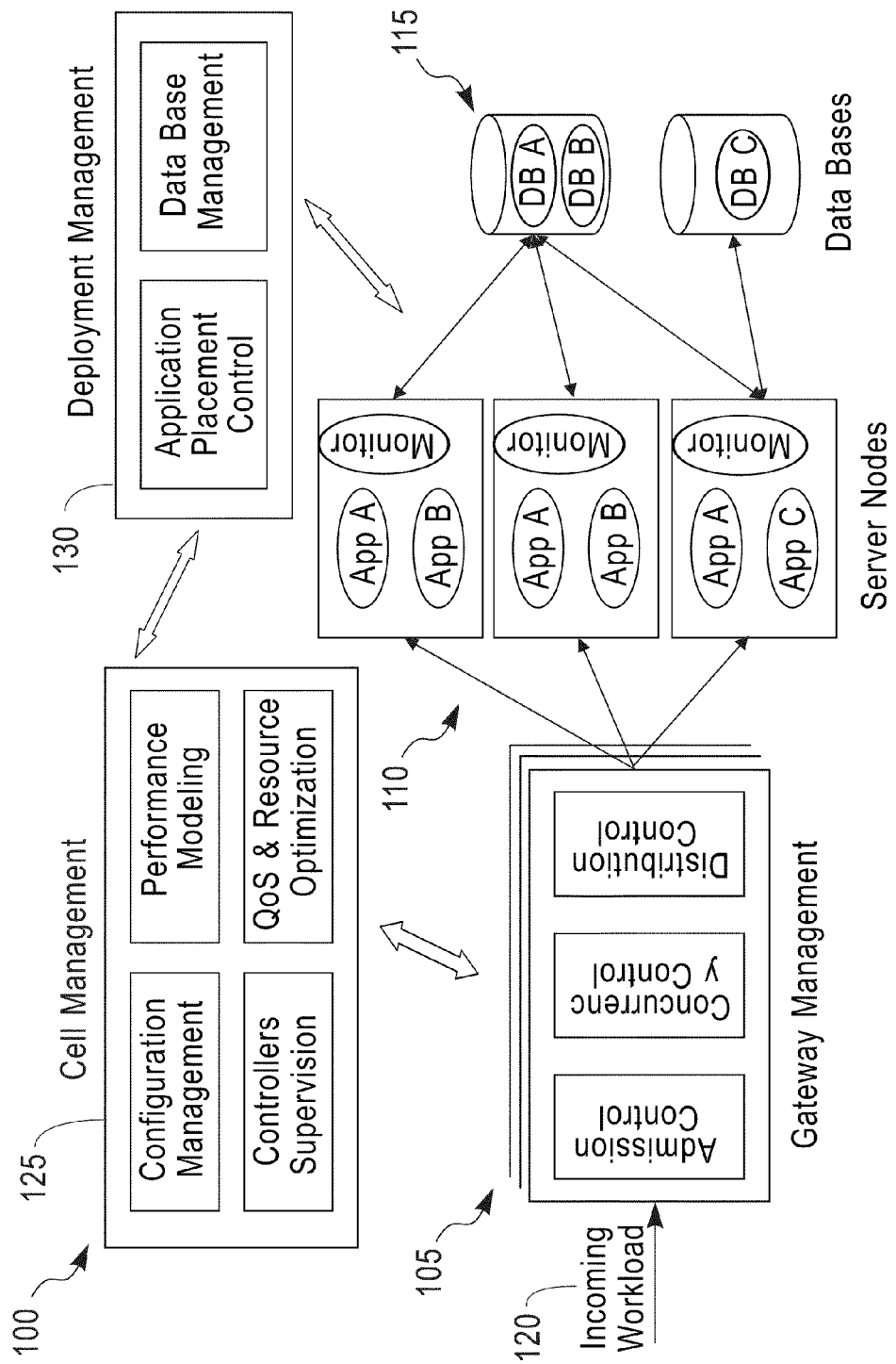
FIG. 1 illustrates an example of a prior art autonomic control architecture of an AS system.

In exemplary embodiments, the systems and methods described herein perform real-time estimation of performance models for AS systems that process multiple classes of transactional workload. Such AS systems process transactional user workload of request/response type such as HTTP workload. Based on an open queueing network model and a modified Extended Kalman Filter (EKF), the exemplary embodiments described herein address the problems in which model parameter estimates converge to the actual value very slowly when the variation in incoming workload is very low, and in which the estimates fail to converge quickly to the new value when there is a step-change caused by adaptive reconfiguration of the actual software parameters. As such a conventional application of the EKF is inadequate in a multi-class setting. The two aforementioned problems contribute to difficulties in real-time modeling of software systems. These convergence anomalies occur due to the under-determined nature of the estimation problem for multiple classes of workloads. In exemplary embodiments, a modified EKF design in which the measurement model is augmented with a set of constraints based on past measurement values is implemented. The exemplary embodiments described herein result in an improved convergence of model parameter estimates when the incoming workload is low and further result in faster convergence of the estimates when there is a step-change caused by adaptive reconfiguration. Experiment results demonstrate that use of this modified EKF leads to significant improvement of the order of 4× to 8× in terms of the time to converge. For illustrative purposes, the exemplary embodiments described herein work with a micro-benchmarking servlet that simulates an adaptive software application. However, it is understood that other systems can be used to simulate adaptive software applications and that other adaptive software systems can benefit from the exemplary embodiments described herein.

As described above, FIG. 1 illustrates a three-tiered AS system 100 and its management in which exemplary performance modeling methods can be performed. The first tier 105 hosts gateway management components, the second tier 110 hosts a web server and the adaptive software applications and the third tier 115 comprises database services. The second tier 110 includes of several server nodes that host the various applications. Adaptive software is deployed as an application in an application server that provides the necessary runtime environment.

Several application servers may run on a given node and several instances of a given application may coexist at the same time. Incoming requests (workload) 120 from users arrive at the first tier 105 where the incoming requests 120 are routed to an appropriate node in the second tier 110. Servicing the incoming requests 120 by an application may trigger further requests to the third tier 115. The completion of a request triggers a response back to the user.

Performance concerns in such an AS system are resource utilization and quality of service in terms of response time. Mechanisms such as cell management 125 and deployment management 130 typically address the concerns of resource utilization and quality of service. Deployment management 130 is concerned with placement of application instances in nodes, as well as database partitioning and replication. Cell management 125 is concerned with the overall operation of the multi-tier system cell. Efficient cell management 125 and deployment management 130 typically require knowledge of performance models in order to predict performance and ensure optimal resource utilization through control. Control mechanisms such as configuration management, QoS and resource optimization, application placement control and database management are integral components of the cell and deployment managers. Other control mechanisms such as admission control, con-currency control and distribution control (or load-balancing) are components of the first tier 105 gateway manager. Monitoring agents running on various server nodes collect measurements that are fed to the cell and deployment management components. These measurements can be used to update the performance model of the system, which can in turn be employed by the various controller components.

The 'performance modeling' component is a key aspect of the cell management 125 since most of the control operations and resource optimization settings are based on a representative model of the system 100. Such models are dynamically updated in real-time to reflect the changing cell characteristics, such as resources, applications or user demand. As such, real-time control of an AS system requires a real-time update of the performance model.

Kalman filter provides a framework for estimating model parameters in a real-time fashion by representing them as the state of an AS system. A Kalman filter is a minimum mean square error (MMSE) estimator that estimates the state from a series of incomplete and noisy measurements. Kalman filter minimizes the covariance of estimation error and operates by propagating both the mean and covariance of state estimates through time. In exemplary embodiments, an open queueing model based EKF design is implemented for estimating service time and network queueing delay parameters of a single node, running a single application and processing three different classes of traffic. For illustrative purposes, a single node and three traffic classes is considered to demonstrate the problems that are encountered in the AS system of FIG. 1 with multiple classes of workload. Such a single node system 200 is shown in FIG. 2.

In exemplary embodiments, to apply the methods described herein the system 200 is treated as a dynamical system. The single node system 200 also includes gateway management 205, cell management 225 and deployment management 230. As described, the system also includes the single server node 210. Measurements on workload 220 arrival rate from a client machine 201 and transactional response times for each of the three user classes a, b, c and CPU utilization (e.g., $U_{web}$, $U_{app}$, $U_{DB}$) of the server node 210 are gathered at a sampling interval of T seconds. These time series data are the input to the filter, which as discussed above can reside in the cell management 225 component. Workload arriving at the software system may be fast changing and non-stationary. T can be considered small enough (e.g., few seconds) so that the arriving workload 220 can be considered stationary during this sampling interval. Then the stationary, queueing theory based performance models hold during this sampling interval. In exemplary embodiments, the state of the system 200 can include service time (e.g., $s^a$, $s^b$, $s^c$) and network delay (e.g., $d^a$, $d^b$, $d^c$) for the three classes, then an EKF can be used to compute a time series estimate of this state.

For three classes indexed as class a, b and c and a single node, the system state x is defined as, $$x = [s^a s^b s^c d^a d^b d^c]^T \quad (1)$$

where, $s^a$, $s^b$ and $s^c$ are service times at the server node 210 for classes a, b and c, respectively, and $d^a$, $d^b$ and $d^c$ are network delays for the three classes. Based on an M/G/1 open queueing network model with processor sharing (PS) service discipline, a measurement model $z = h(x)$ is defined as, $$\begin{bmatrix} R^a \\ R^b \\ R^c \\ u \end{bmatrix} = \begin{bmatrix} \frac{s^a}{1-u} + d^a \\ \frac{s^b}{1-u} + d^b \\ \frac{s^c}{1-u} + d^c \\ \frac{1}{p}(\lambda^a s^a + \lambda^b s^b + \lambda^c s^c) \end{bmatrix} \quad (2)$$

where, $\lambda^a$, $\lambda^b$ and $\lambda^c$ are workload arrival rates, $R^a$, $R^b$ and $R^c$ are response times of the three classes (i.e., a, b, c), u is the CPU utilization averaged over all CPUs of the only node and P is the number of CPUs. If each sampling interval is denoted by k then the dynamics for state evolution are given as, $$x_k = F_k x_{k-1} + w_k$$

where, $F_k$ is the state transition model which is applied to the previous state $x_{k-1}$ and $w_k$ is the process noise which is assumed to be drawn from a zero mean, multivariate normal distribution with covariance $Q_k$, i.e., $w_k \sim N(0, Q_k)$. The iterative measurement equation for Kalman filter is taken to be, $$z_k = H_k x_k + v_k$$

where, $H_k$ is the observation model which maps the true state space into the observed space and $v_k$ is the observation noise which is assumed to be zero mean, Gaussian white noise with covariance $R_k$, i.e., $v_k \sim N(0, R_k)$. Since the measurement model in Equation 2 is non-linear in terms of the system state parameters (due to utilization u in the denominator), the 'Extended' version of the Kalman filter is implemented. The corresponding Jacobian matrix of the measurement model is given by, $$H = \frac{\partial h}{\partial x}$$

$$= \begin{bmatrix} \frac{1-u+\frac{\lambda^a s^a}{P}}{(1-u)^2} & 0 & 0 & 1 & 0 & 0 \\ 0 & \frac{1-u+\frac{\lambda^b d^b}{P}}{(1-u)^2} & 0 & 0 & 1 & 0 \\ 0 & 0 & \frac{1-u+\frac{\lambda^c d^c}{P}}{(1-u)^2} & 0 & 0 & 1 \\ \frac{\lambda^a}{P} & \frac{\lambda^b}{P} & \frac{\lambda^c}{P} & 0 & 0 & 0 \end{bmatrix}$$

In addition, $H_k$ can be computed as $$H_k = \left[\frac{\partial h}{\partial x}\right]_{\hat{x}_{k|k-1}}$$

Standard EKF theory is implemented to track the system state over time. The Kalman filter is a recursive estimator, which means that only the estimated state from the previous time step and the current measurements are needed to compute the estimate for the current state. In the following EKF algorithm, the notation $\hat{x}_{n|m}$ represents the estimate of x at time n given observations up to and including time m. The state of the filter itself is represented by two variables:

1) $\hat{x}_{k|k}$ is the estimate of state at time k given observations up to and including time k.

2) $P_{k|k}$ is the error covariance matrix (a quantitative measure of estimated accuracy of the state estimate).

The Kalman filter algorithm has two distinct phases: Predict and Update. The predict phase uses the state estimate from the previous time interval to produce an estimate of the state at current time interval. In the update phase, measurement information at the current time interval is used to refine this prediction to arrive at a new, more accurate state estimate, again for the current time interval. These two phases are given as, Predict:

$$\hat{x}_{k|k-1} = F_k \hat{x}_{k-1|k-1}$$

$$P_{k|k-1} = F_k P_{k-1|k-1} F_k^T + Q_k$$

Update:

$$\tilde{y}_k = z_k - h(\hat{x}_{k|k-1})$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}_k$$

$$P_{k|k} = (I - K_k H_k) P_{k|k-1}$$

In exemplary embodiments, the filter design can be implemented as a stand-alone Java application as further described herein. Measurements gathered during experiments can be fed into this application to obtain service time and delay estimates.

As described herein, implementation of an EKF for tracking model parameters of an AS system with multiple classes of workload has convergence problems. For the single class case, an EKF can track step-change in parameters without any convergence problems. However, if there are y classes then there are 2y unknowns to be estimated, i.e., service time and delay parameters for each class. Whereas, the number of measurements available is only y+1, i.e., response time for each class and CPU utilization for the single server node. User request rate measurements cannot be used in the left hand side of the measurement model (Equation 2) to increase the total number of knowns from y+1 to 2y+1. Each measurable or known quantity corresponds to a constraint on the state in the measurement model. For a single class (y=1), there are sufficient measurable knowns to estimate the unknown variables. However, for multiple classes (e.g., y≧2), an under-determined system results since the number of measurable knowns is less than the number of unknowns. As such, there is a lack of a unique solution for the filter estimates at each time step. The EKF fails to compute a unique estimate for the service time and delay parameters and instead proposes feasible but undesirable solution estimates. The result is undesirable estimates, leading to slow convergence towards the actual expected values as illustrated in the examples herein.

The under-determined nature of the estimation problem discussed above can be addressed by increasing the number of observations in the measurement model. Increasing the number of observations in the measurement model can be done by using measurements from recent past to construct constraints on the current state $x_k$ and augmenting them as perfect measurements to the measurement model. Assuming that the state vector remains stationary over the past $l_1 + l_2 + \ldots + l_N$ sampling intervals, the state at time k must perfectly satisfy (i.e., without noise) the measurement equation based on measurements from the last $l_1 + l_2 + \ldots + l_N$ sampling intervals. Here, N is the number of constraints and each $l_i$, i=1 ... N is the number of sampling intervals whose measurements are averaged to build each of the N constraints. The measurement model for time step k can thus be augmented with a set of constraints $Dx_k = d$:

$$\begin{bmatrix} z_k \\ d \end{bmatrix} = \begin{bmatrix} H_k \\ D \end{bmatrix} x_k + \begin{bmatrix} v_k \\ 0 \end{bmatrix} \quad (3)$$

where, $$d = [d_1 \quad d_2 \quad \ldots \quad d_N]^T$$

and $$D = [D_1 \quad D_2 \quad \ldots \quad D_N]^T$$

Here, $$d_i = \bar{z}_{l_i} = \frac{1}{l_i} \sum_{j=p}^{q} z_{k-j} \quad \forall i = 1 \ldots N$$

wherein $d_i$, i=1 to N represent the elements of vector d with each $d_i$ being a vector in itself, $\bar{z}_{l_i}$ is just another notation for $d_i$ and represents the mathematical operation of averaging the measurement vectors $z_{k-j}$ as shown, j is an index variable, p is the lower index limit in the summation term, q is the upper index limit in the summation term, $z_{k-j}$ is the measurement datum gathered at time step k-j, and $l_i$, ... i=1 to N is the size in number of time steps of each of the N time windows. Values of p and q above are computed as, $$p = 1 + \sum_{r=1}^{i-1} l_r \text{ and } q = \sum_{r=1}^{i} l_r,$$

wherein r is an index variable and $l_1$ is the size in number of time steps of the $r^{th}$ time window.

Similarly, $$D_i = \bar{H}_{l_i} = \frac{1}{l_i} \sum_{j=p}^{q} H_{k-j} \quad \forall i = 1 \ldots N$$

where, p and q are defined the same as above, $D_i$, i=1 to N represent matrix elements of matrix D with each $D_i$ being a matrix in itself, $\bar{H}_{l_i}$ is just another notation for $D_i$ and represents the mathematical operation of averaging the model matrices $H_{k-j}$ as shown, j is an index variable, p is the lower index limit in the summation term, q is the upper index limit in the summation term, $H_{k-j}$ is the measurement model matrix computed at time step k-j as per the extended Kalman filter operation, and $l_i$, i=1 to N is the size in number of time steps of each of the N time windows. Instead of augmenting the constraints as perfect measurements with zero measurement noise, it is also possible to generalize further and consider the constraints as noisy measurements with a non-zero noise term in Equation 3. The generalization can be given by.

$$\begin{bmatrix} z_k \\ d \end{bmatrix} = \begin{bmatrix} H_k \\ D \end{bmatrix} x_k + \begin{bmatrix} v_k \\ e_k \end{bmatrix}$$

where $e_k$ is a noise vector.

In exemplary embodiments, the augmented measurement model of Equation 3 is different from the standard theory on constrained Kalman filtering. The difference is that actual measurements from recent past are used to construct the constraints instead of relying on any a-priori knowledge about constraints on the state space. As such, the EKF design is modified to incorporate the augmented measurement model of Equation 3.

In exemplary embodiments, the purpose of incorporating additional constraints is to have at least as many linearly independent knowns or observations as the number of unknowns. In the examples illustrated, the number of unknowns is 2y. With one more additional set of constraints, i.e., N=1, the number of observations become 2(y+1), which is sufficient to have a determined system if at least 2y of these 2(y+1) observations are linearly independent. For illustrative purposes, N=1 is implemented as being sufficient to have the determined system. In other exemplary embodiments, more than one additional set of constraints may be implemented for improved results.

In exemplary embodiments, the choice of each $l_i$ is specific to a given set of circumstances, as is seen in the examples. The choice of $l_i$ can depend on the rate of change of the software system parameters (i.e., due to their time-varying nature) and the sampling interval T. Some systems may require updating the value of $l_i$ at each time step k. It is appreciated that the choice of $l_i$ is therefore system specific.

For the examples below, values of N and $l_i$ are chosen through empirical observation of results. They are given in Table 1:

TABLE 1

| Experiment | N | $l_1$ | $l_2$ |
|---|---|---|---|
| LVW | 2 | 4 | 3 |
| BSP | 1 | 3 | n/a |

For the examples described below, reference is made again to FIG. 2, which illustrates the single node AS system 200 with three user workload classes a, b, c. The system 200 includes a web-based environment including a synthetic HTTP traffic generator at the client machine 201 and a single server node 210. In exemplary embodiments, the single server node 210 can be a micro-benchmarking servlet that simulates an adaptive software application. Each HTTP request/transaction is served by the micro-benchmarking servlet that alternates between computing and sleeping. Servlet parameters controlling the behavior of the execution of a request are: the total amount of computation (specified in terms of the number of loops over some arithmetic computation), duration of computation between sleeps and the duration of sleep. These parameters may be fixed or drawn from some probability distribution. The parameters can be provided in the HTTP request and are configurable through a synthetic traffic generator tool. Given values of these servlet parameters translate into values of service time and delay parameters. Adaptivity of a software system can be simulated by manually changing the servlet parameters through an HTTP request, that result in modified values for the service time and delay parameters.

In exemplary embodiments, the traffic generator can be written in Java and generates HTTP requests of different types. A configurable number of parallel threads simulate the web clients. The think time, defined as interval between the receipt of a response from server node and submission of a subsequent request, is specified by a probability distribution. A sum of a fixed bias (125 msec) and an exponentially distributed time with mean 125 msec can be implemented. Load on the system can be altered by varying the number of clients. Changing the parameters may be performed manually or programmatically. For a low variation in workload as further described herein, the parameters are not changed and kept fixed, resulting in a stationary workload. For a step-change in system parameters, an additional component of the traffic generator can be activated that resulted in sinusoidal waves in the workload. This additional component took as input the amplitude (maximum number of clients), the phase in degrees (allowing different request flows to have different phases) and the periodic length (for the time duration of a sinusoidal cycle).

The micro-benchmarking servlet can be deployed as an application in an IBM WebSphere cell that includes a single server node and additional management nodes: gateway management 205, cell management 225, and deployment management 230. Monitoring agents ran on the server node 210 for collecting statistical measures in a non-intrusive manner, without the need to instrument the application. In exemplary embodiments, workload arrival rates, response times of requests and CPU utilization of the server node 210 are measured. Once the micro-benchmarking servlet is deployed, the server node 210 ceases to interact with the deployment management 230, which ensures that management nodes do not interfere with request/transaction processing activity at the server node 210. IBM WebSphere platform version 6.1 (ND 6.1.0.17) (XD 6.1.0.3) is used in the examples.

The traffic generator tool ran on a client machine with a single Xeon 2.8 GHz Intel processor, 512 KB cache and 2 GB RAM. Three different types of transaction classes were generated during the experiments. Each class a, b, c was denoted by a different class ID in the HTTP request and was generated using different values for the traffic generator parameters. The servlet application runs on a server node with a single Xeon 3.06 GHz Intel processor, 512 KB cache and 2 GB RAM. The servlet processes different classes of transactions differently, through unique values of servlet parameters that results in unique values of service times and delays for each class.

Example 1

Figure 2:
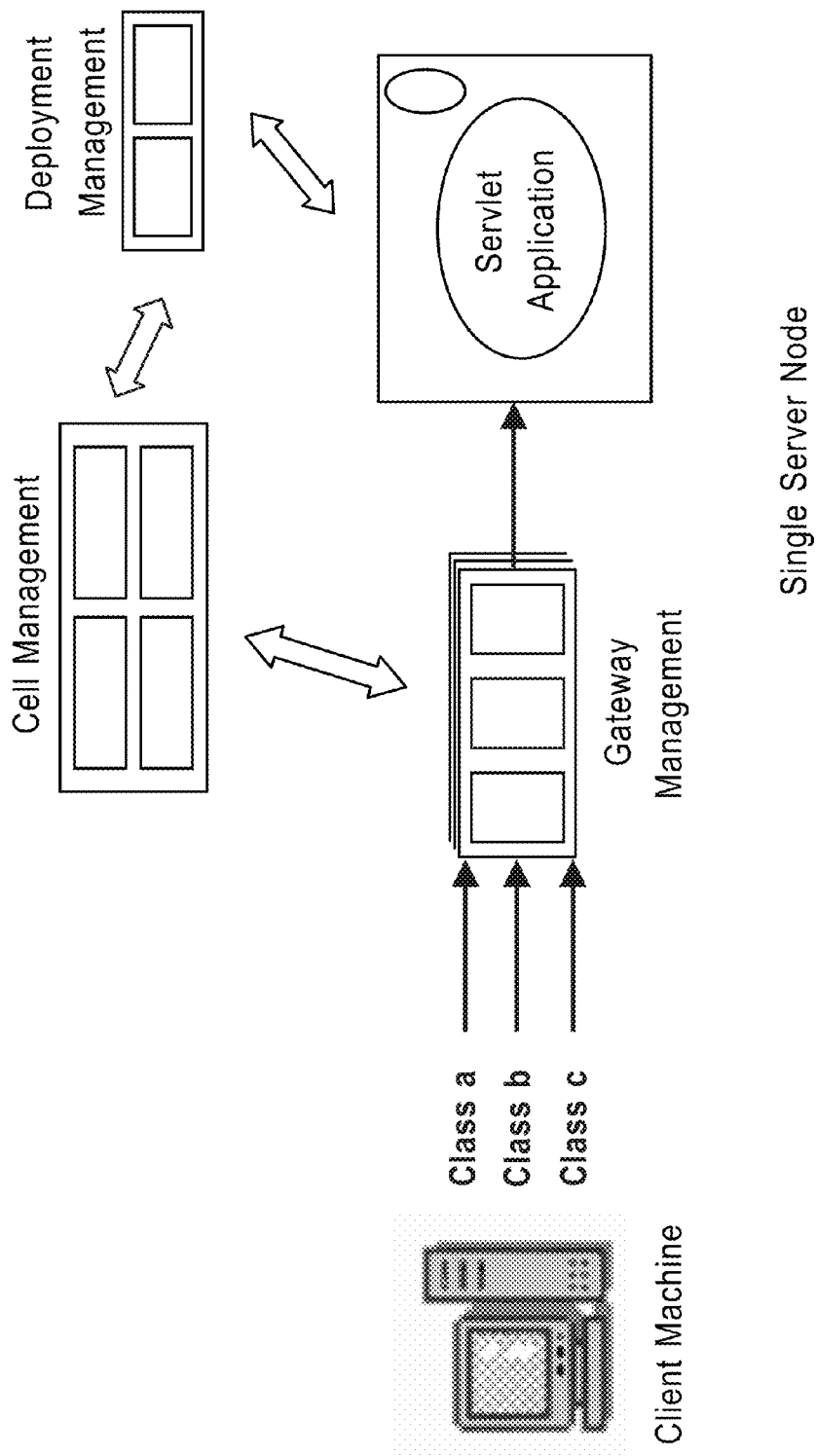
FIG. 2 illustrates an exemplary single node autonomic control architecture of an AS system in which exemplary real-time performance modeling methods can be implemented.

In a low variation in workload (LVW) condition, as part of gateway management 105 in the AS system 100 of FIG. 1, an admission control mechanism operates to ensure a smooth workload profile. The mechanism attempts to remove spikes in the incoming user request rate leading to a smooth workload with low variations in the admitted request rate. The smooth workload is the motivation for an LVW condition in which the admission control leads to a workload with low coefficients of variation for the three classes a, b, c.

Figure 3:
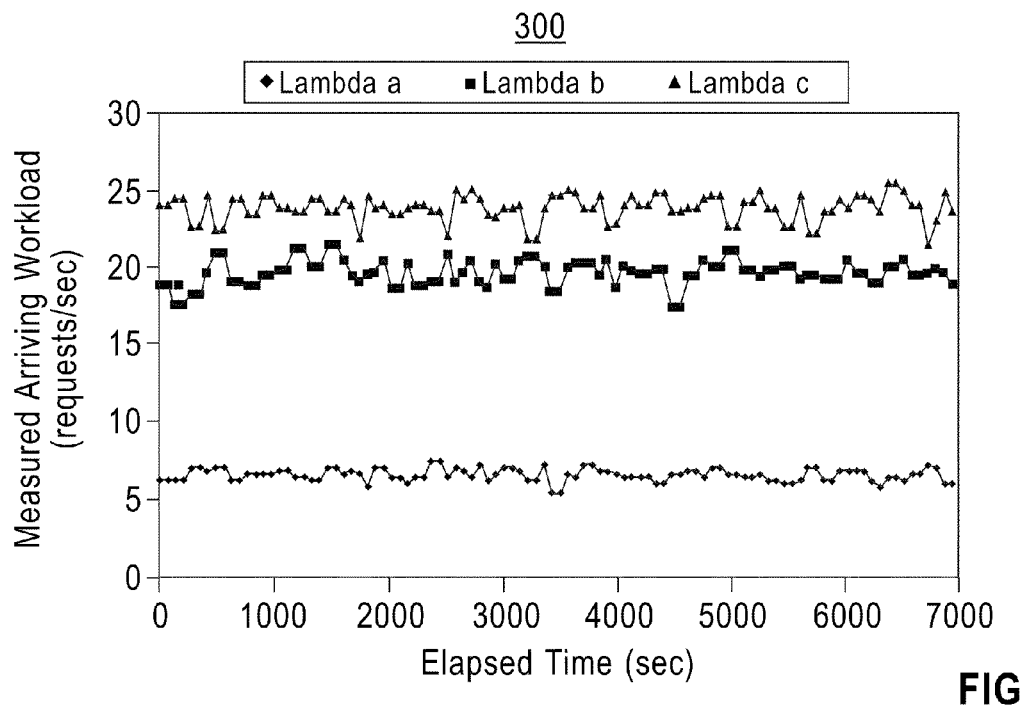
FIG. 3 illustrates a plot of workload versus elapsed time for a low variation in workload condition.
Figure 4:
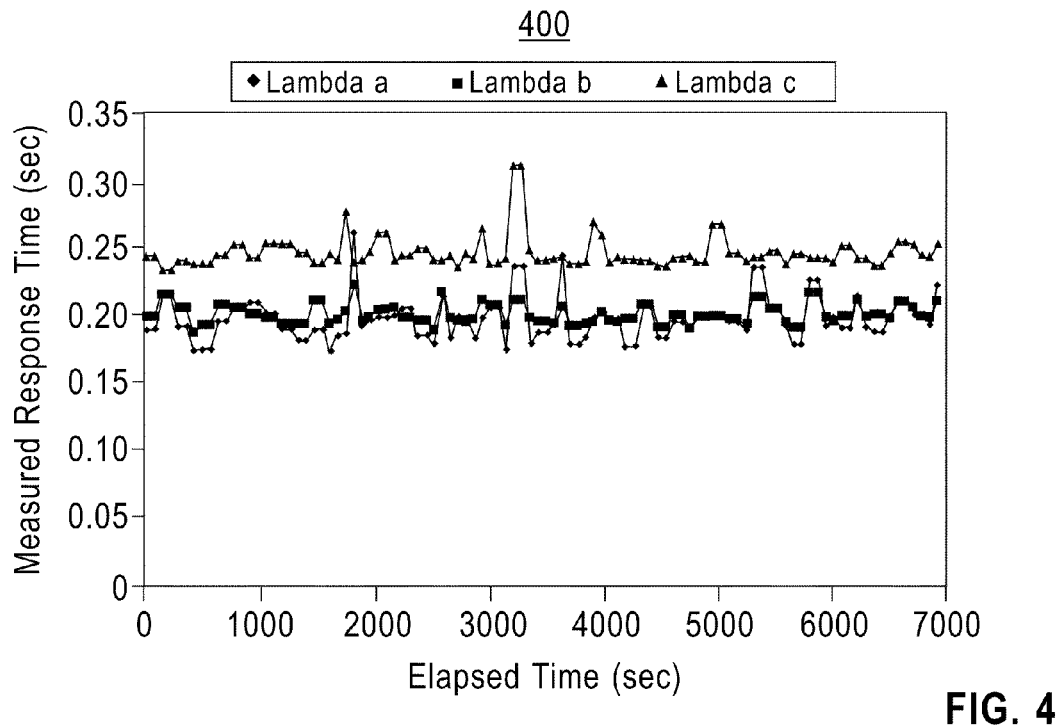
FIG. 4 illustrates a plot of the response time versus elapsed time for a low variation in workload condition.
Figure 5:
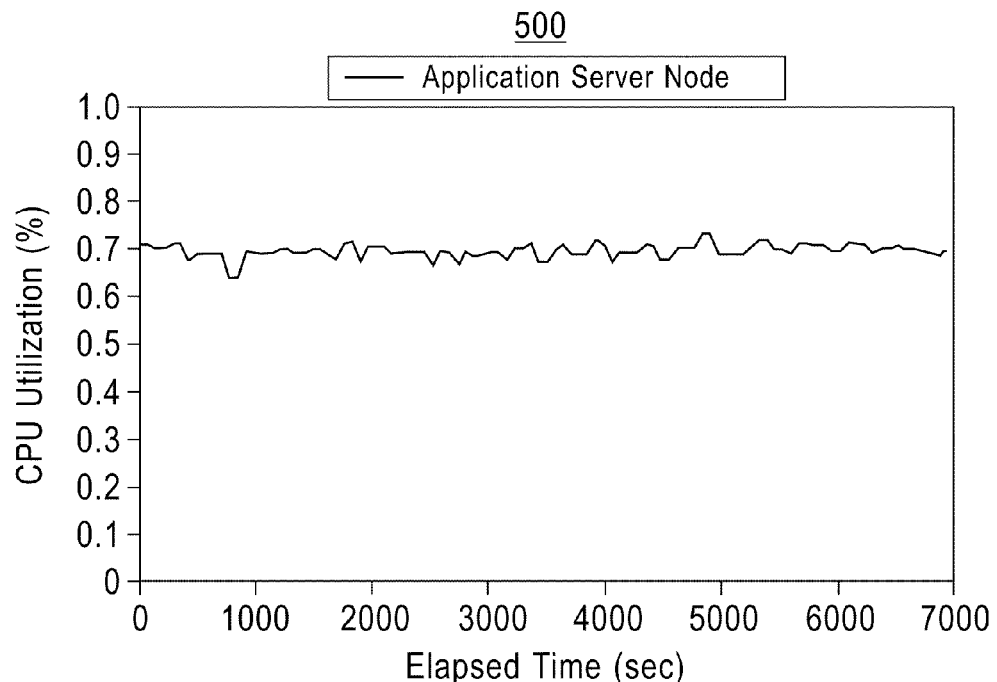
FIG. 5 illustrates a plot of CPU utilization versus elapsed time for a low variation in workload condition.
Figure 6:
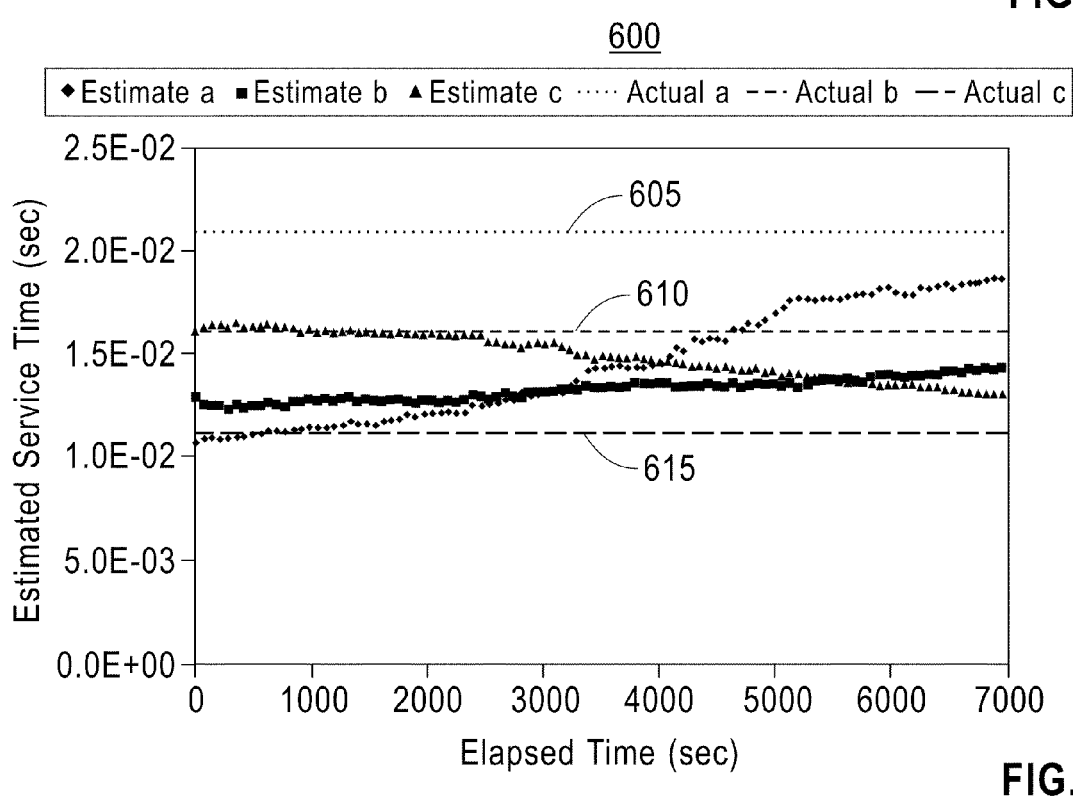
FIG. 6 illustrates a plot of the computed service time estimates versus elapsed time.
Figure 7:
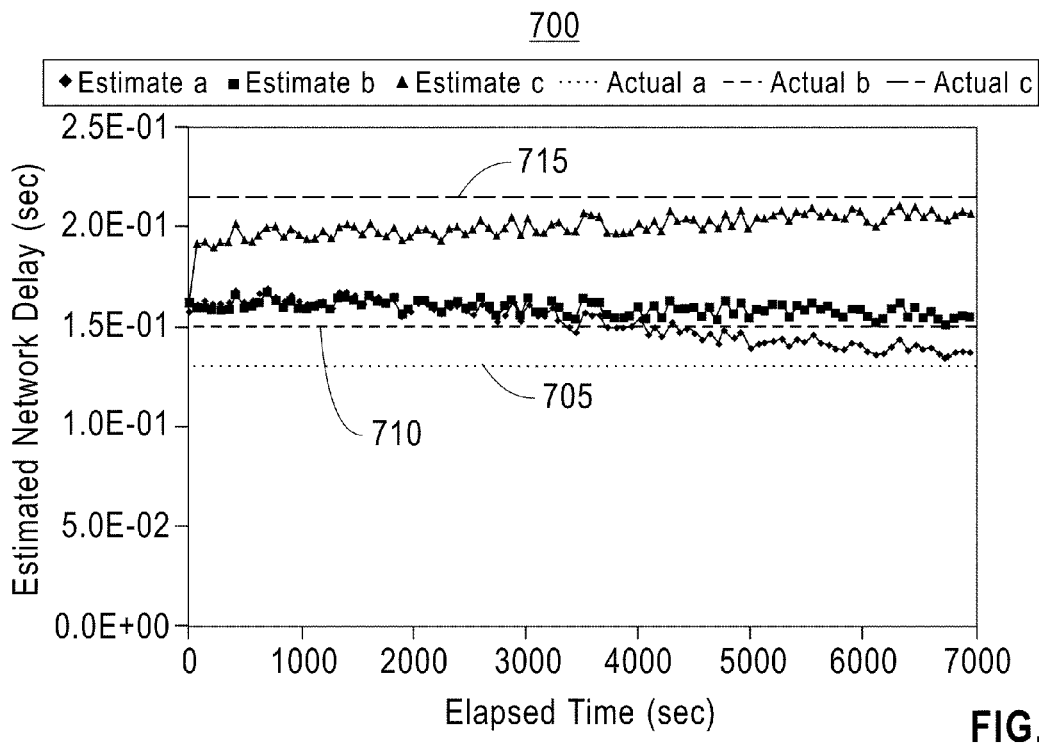
FIG. 7 illustrates a plot of the computed network delay estimates versus elapsed time.
Figure 8:
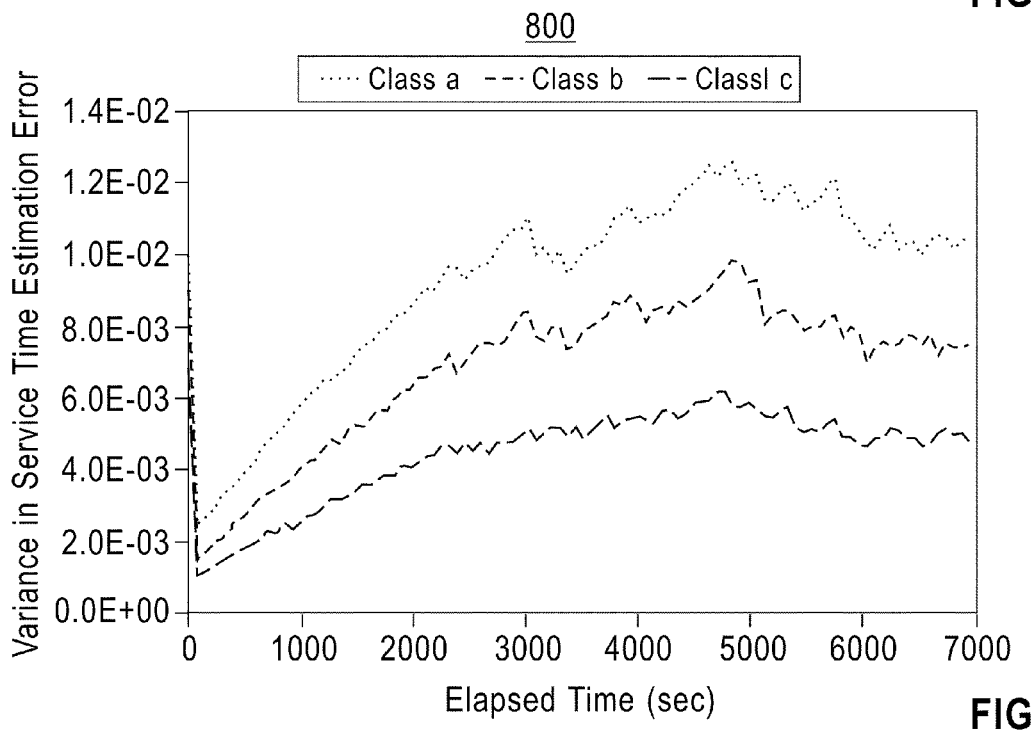
FIG. 8 illustrates a plot of the variance in service time estimation error versus elapsed time.
Figure 9:
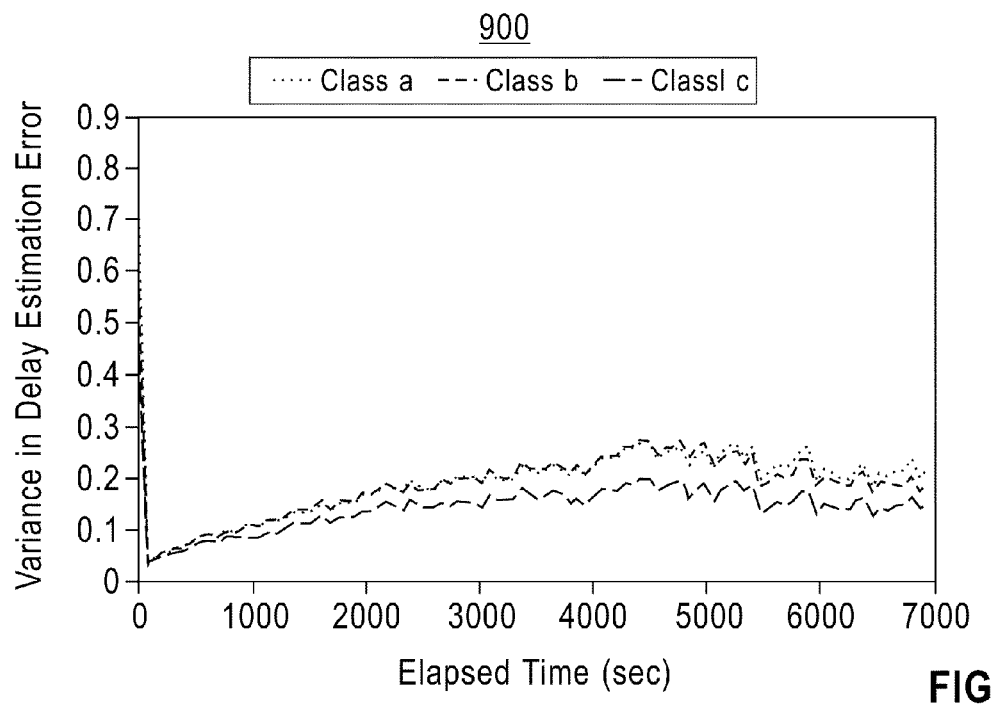
FIG. 9 illustrates a plot of the variance in delay estimation error versus elapsed time.

FIG. 3 illustrates a plot 300 of arriving workload (requests/sec) versus time in which the coefficient of variation for inter-arrival time of incoming workload is much less than one. The three different time series depict the transactional workload for classes a, b and c. Their coefficients of variation are 0.176, 0.143 and 0.104 for classes a, b and c, respectively. FIGS. 4 and 5 illustrate plots 400, 500 of the response time versus elapsed time and CPU utilization versus elapsed time measurements. All three measurements were taken as per recommendations for the sampling time T. The three sets of data were fed in to the Java implementation of the EKF to estimate service time and network delay parameters for the three classes a, b, c. FIGS. 6 and 7 illustrate plots 600, 700 of computed service time and network delay estimates, respectively. The flat horizontal lines 605, 610, 615, 705, 710, 715 in both plots are the expected, actual values of service time and delay, as a result of the chosen servlet parameters for the compute-sleep micro-benchmarking servlet. The filter was tuned based on the recommended values for Q and R matrices. In spite of following the tuning recommendations, both service time and delay estimates in FIGS. 6 and 7 tend to converge to the actual values very slowly. Even after 6000 seconds of elapsed time the estimates for all classes have not reached the actual values. FIG. 8 illustrates a plot 800 of the variance in service time estimation error versus elapsed time, and FIG. 9 illustrates a plot 900 of the variance in delay estimation error versus elapsed time. As a quantitative measure of the performance of the filter, FIGS. 8 and 9 show the variances in estimation error which are essentially the diagonal elements of $P_{k|k}$ matrix as time step k evolves. Clearly the variances do not converge and instead gradually increase and only slightly decrease thereafter. Qualitatively, non-convergence of the variances to a low steady-state value indicates the 'badness' of the estimates.

Figure 10:
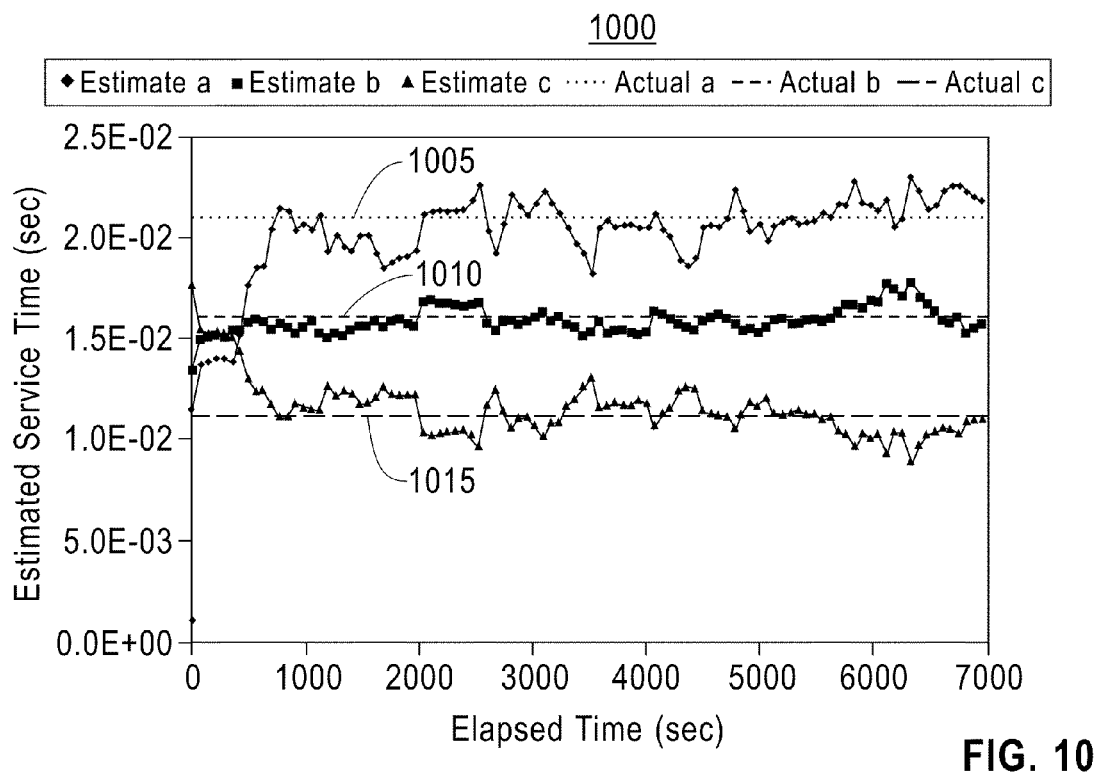
FIG. 10 illustrates a plot of estimated service time versus elapsed time for the low variation in workload condition using a modified EKF in accordance with exemplary embodiments.
Figure 11:
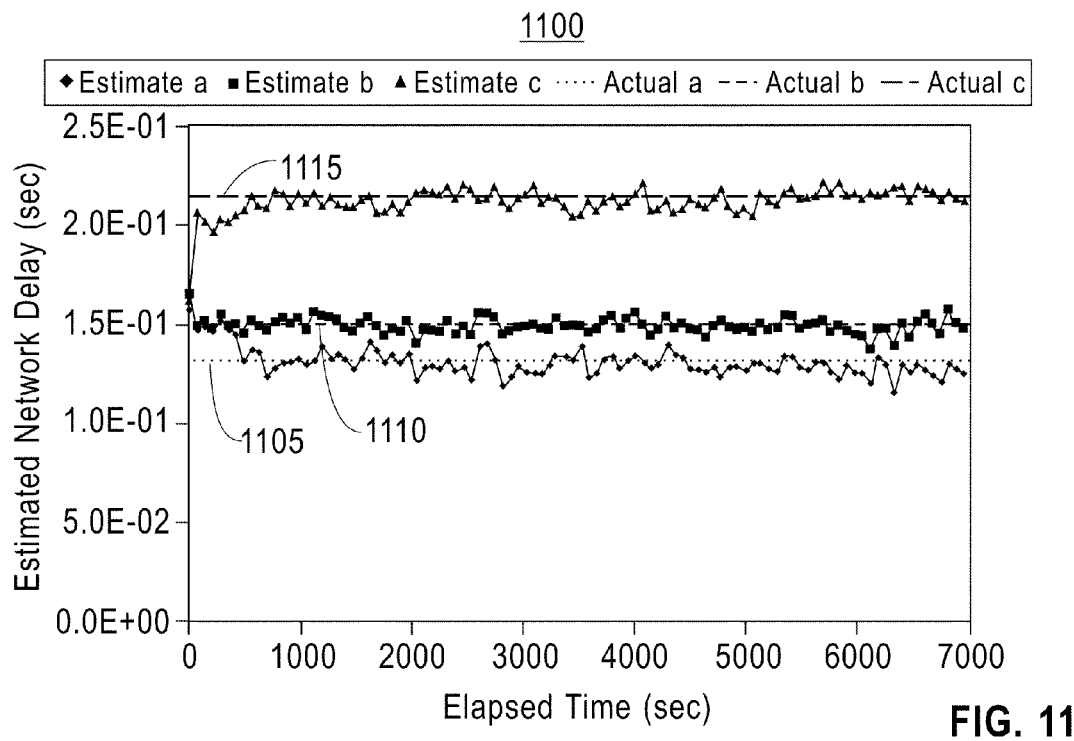
FIG. 11 illustrates a plot of estimated network delay versus elapsed time for the low variation in workload condition using a modified EKF in accordance with exemplary embodiments.

FIGS. 10 and 11 illustrate plots 1000, 1100 of estimated service time versus elapsed time and estimated network delay versus elapsed time for the LVW condition using the exemplary modified EKF. The flat horizontal lines 1005, 1010, 1015, 1105, 1110, 1115 in both plots are the expected, actual values of service time and delay, as a result of the chosen servlet parameters for the compute-sleep micro-benchmarking servlet. N=2 additional constraints were used for results in these figures. There is faster convergence of estimates to the actual values as compared to FIGS. 6 and 7. The additional constraints in the augmented measurement model increase the number of linearly independent knowns. This tends to reduce the under-determined nature of the estimation problem and the filter converges to the desirable, unique solution much faster. The fluctuations of estimates around the actual values in FIGS. 10 and 11, reflect changes in the server node due to any background processes, context switching and fluctuating CPU cycles consumed for memory management.

Figure 12:
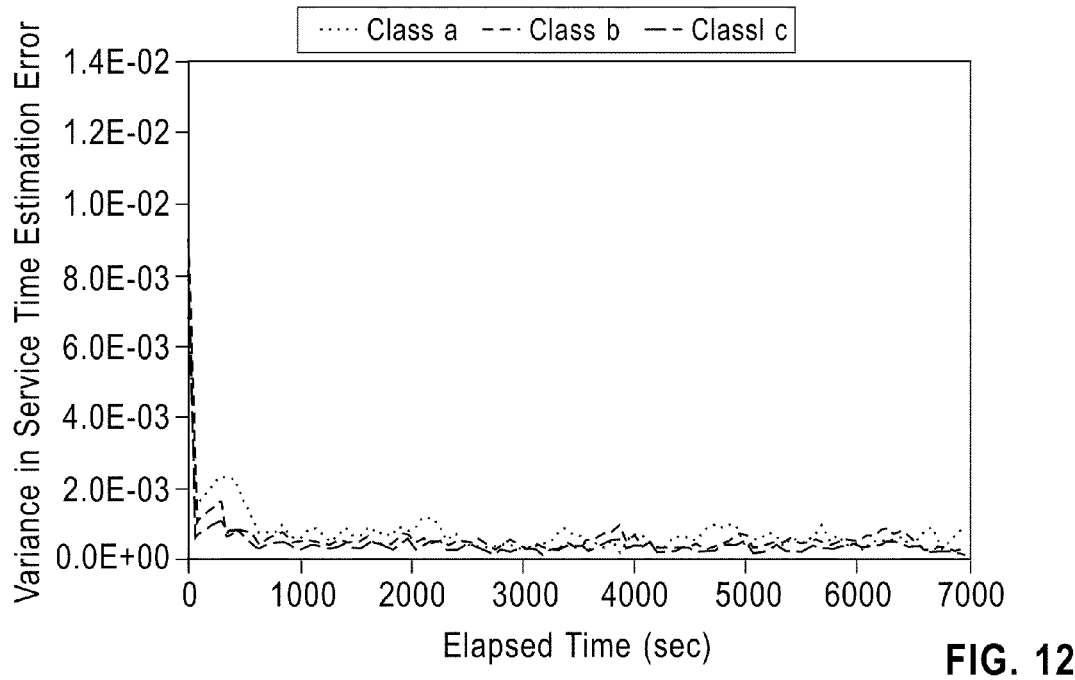
FIG. 12 illustrates a plot of variance in service time estimation error versus elapsed time in accordance with exemplary embodiments.
Figure 13:
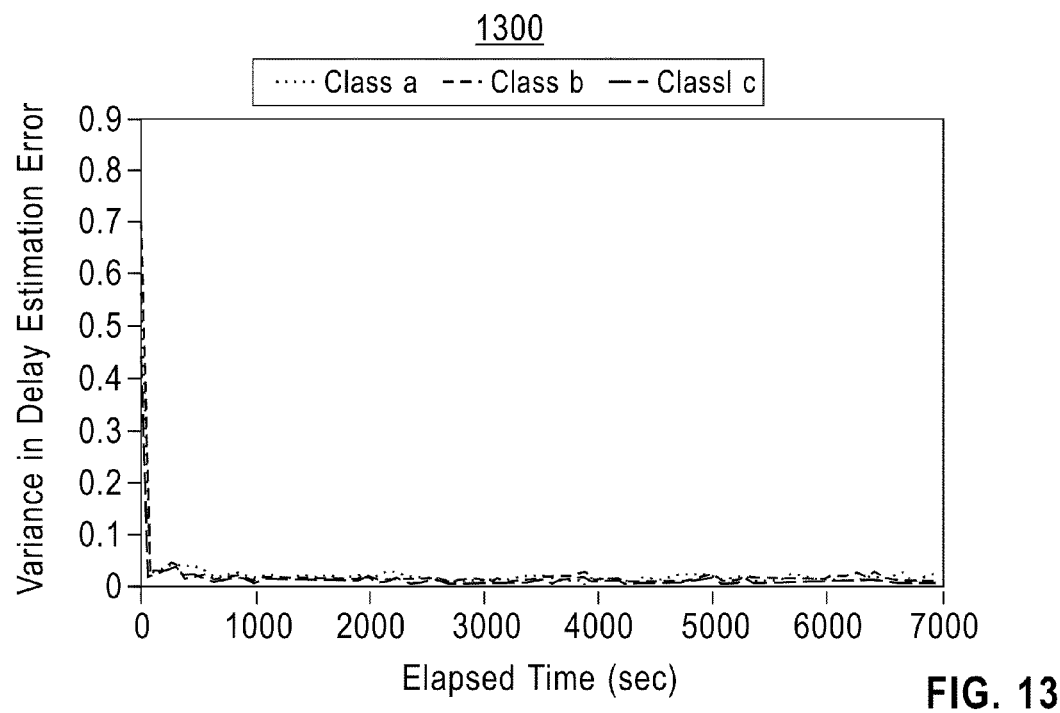
FIG. 13 illustrates a plot of variance in delay estimation error versus elapsed time in accordance with exemplary embodiments.

With the modified EKF, estimates reach close to their actual expected values within around 700 seconds. Compare this number with FIGS. 6 and 7 where the estimates do not converge to their actual values even after 6000 seconds. The order of improvement here is more than 8× in terms of the time to converge. This is substantial improvement with the modified EKF design. FIG. 12 illustrates a plot 1200 of variance in service time estimation error versus elapsed time in accordance with exemplary embodiments and FIG. 13 illustrates a plot 1300 of variance in delay estimation error versus elapsed time in accordance with exemplary embodiments. FIGS. 12 and 13 show the improvement quantitatively, in terms of the variances in estimation error that converge to very low and steady-state values.

Example 2

In a step-change in system parameter (SSP) condition, reconfiguration of the software architecture, components and functions in an AS system in order to accommodate sudden changes in the execution environment can lead to step-changes in the service time and queueing delay parameters. To simulate adaptive reconfiguration, the servlet parameters can be altered. If there is a step change of actual parameters caused by adaptive reconfiguration of the software, the software adapts to changes in the incoming workload, execution environment, and the like. A step change can be simulated by manually exchanging the servlet parameters twice between two of the classes a and c. Instead of a mere exchange, the parameters for the two classes a and c could have also been changed to other different values. However, exchange of parameters was done for the sake of simplicity and easy presentation.

Figure 14:
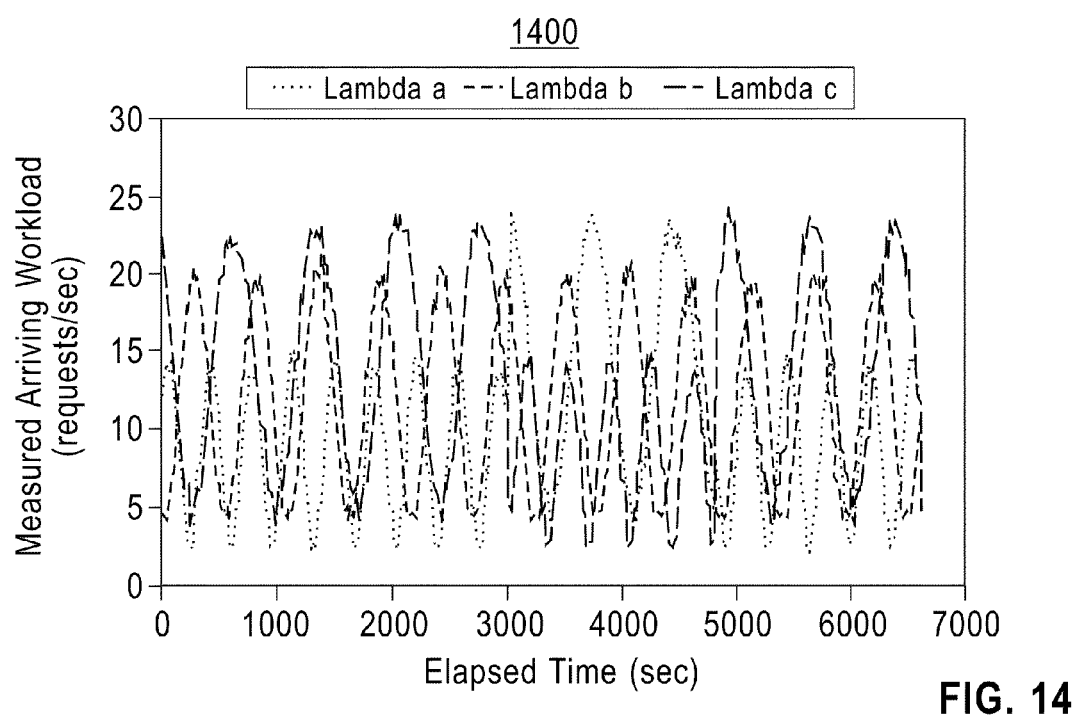
FIG. 14 illustrates a plot of workload versus elapsed time for a step-change in system parameter condition.
Figure 15:
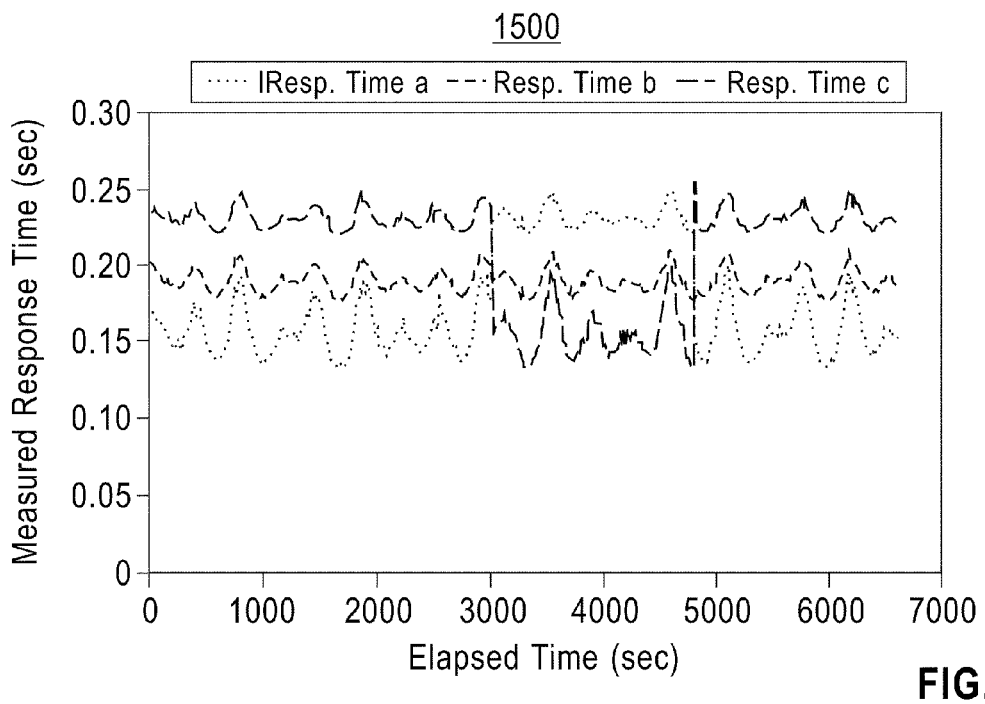
FIG. 15 illustrates a plot of response time versus elapsed time for a step-change in system parameter condition.
Figure 16:
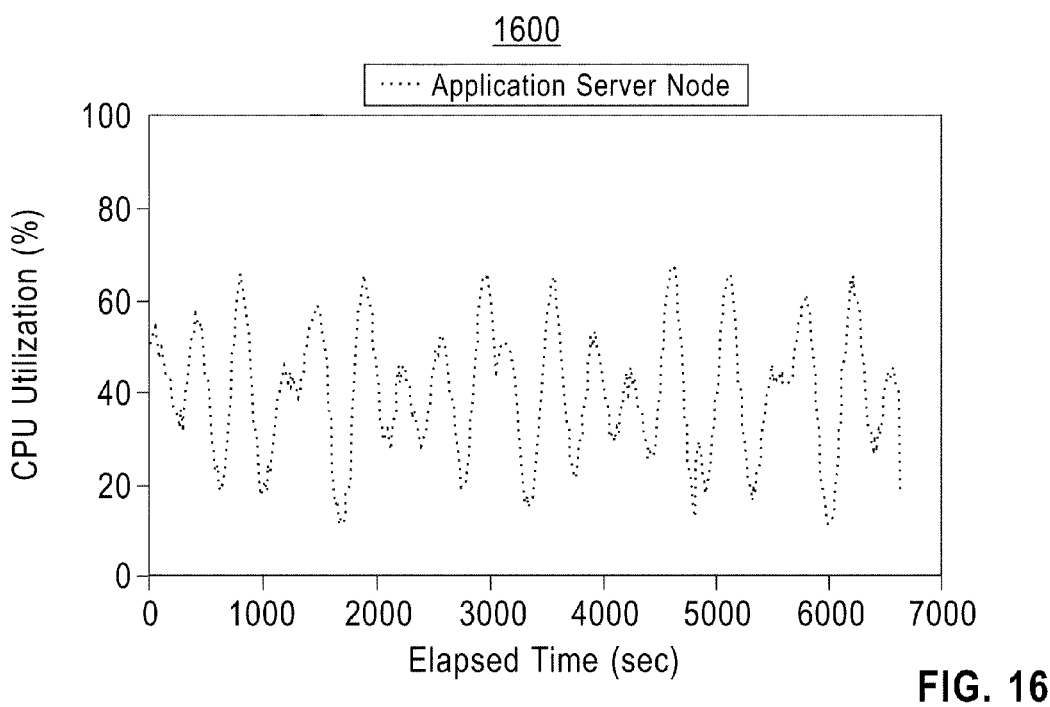
FIG. 16 illustrates a plot of CPU utilization versus elapsed time for a step-change in system parameter condition.
Figure 17:
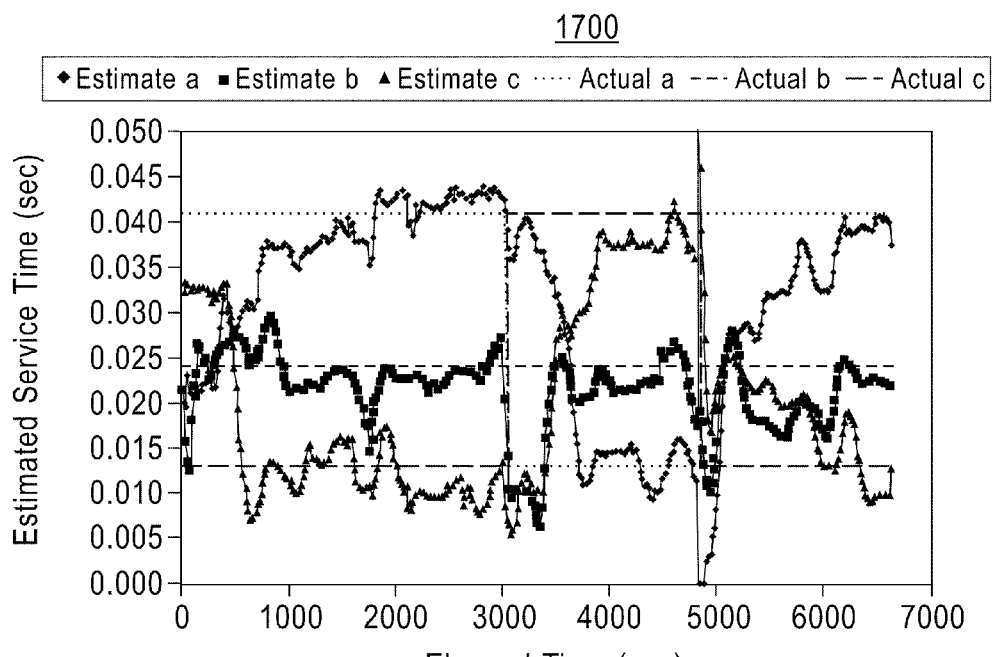
FIG. 17 illustrates a plot of the computed service time estimates versus elapsed time.
Figure 18:
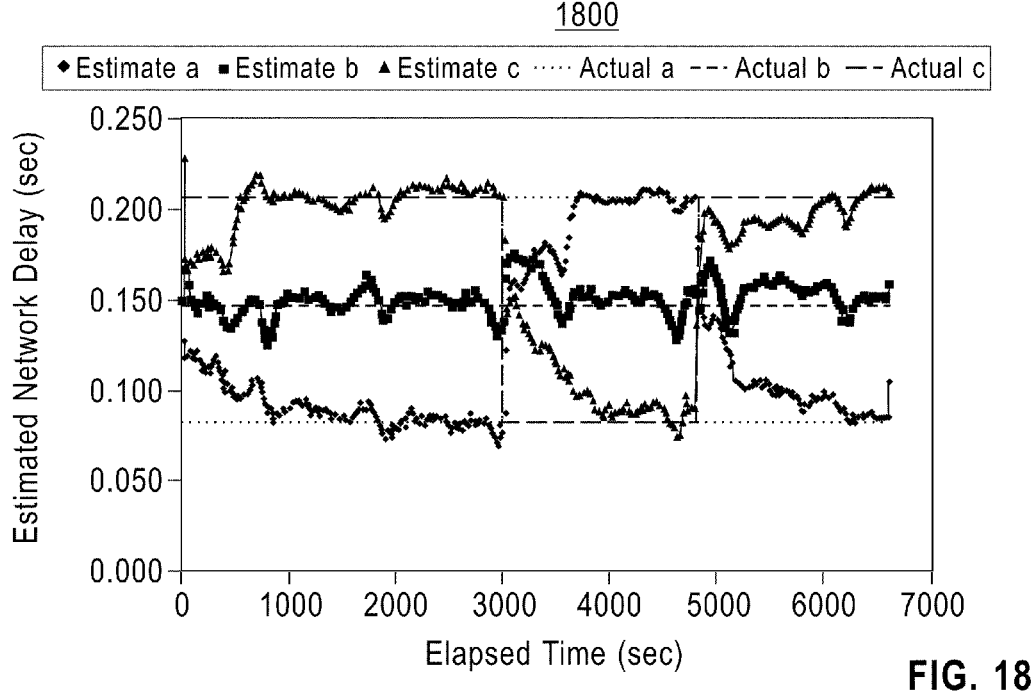
FIG. 18 illustrates a plot of the computed delay estimates versus elapsed time.
Figure 19:
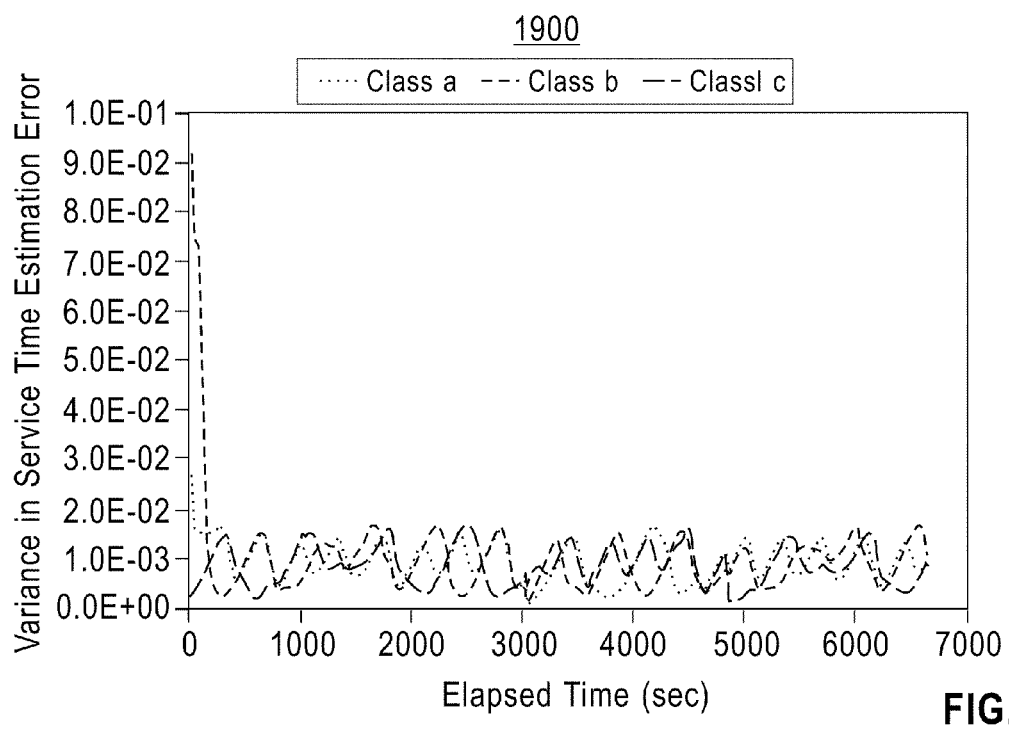
FIG. 19 illustrates a plot of the variance in service time estimation error versus elapsed time.
Figure 20:
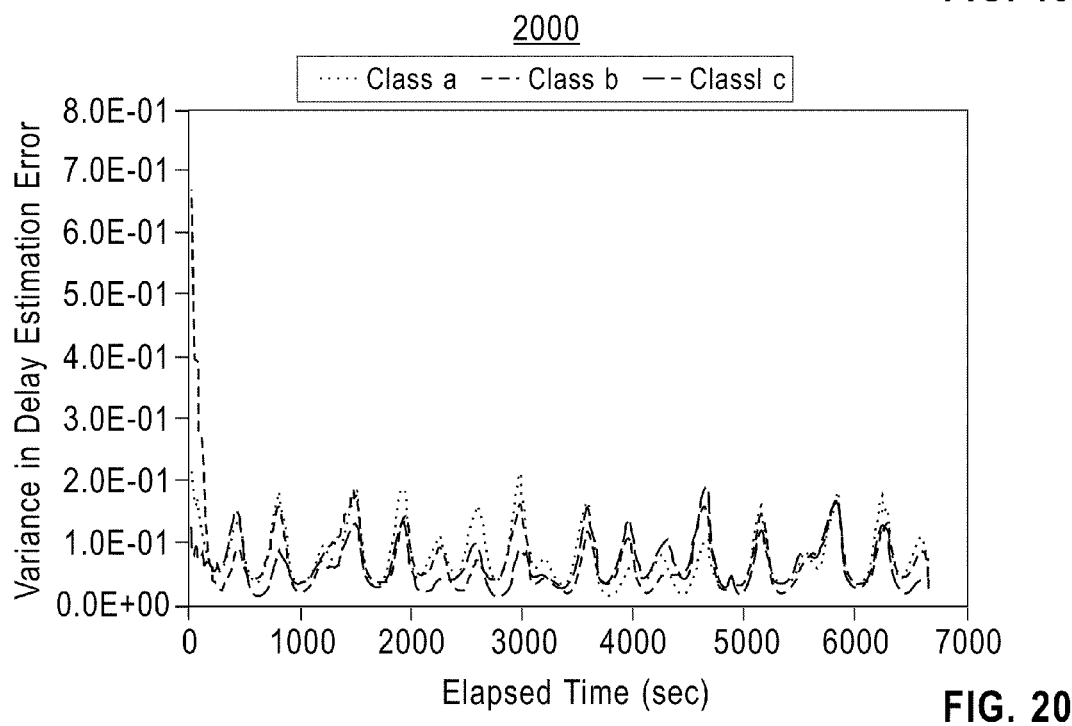
FIG. 20 illustrates a plot of the variance in delay estimation error versus elapsed time.

FIGS. 14, 15 and 16 illustrate plots 1400, 1500, 1600 of workload versus elapsed time, response time versus elapsed time and CPU utilization versus elapsed time measurements, respectively. There is a periodic and high varying nature of the workload. FIGS. 17 and 18 illustrate plots 1700, 1800 of the service time versus elapsed time and delay versus elapsed time estimates using the EKF along with their expected actual values depicted by the flat lines. There is also a manually introduced step-change in the actual values at two points 3000 s and 5000 s. The filter was again tuned based on the recommended values for Q and R matrices and measurement sampling interval. In FIGS. 17 and 18 it is seen that in the beginning of the experiment the service time and delay estimates converge to their expected values much faster than in the LVW experiment discussed previously. Thus, having a high varying workload improves the tracking of parameters by the filter. The service time and delay estimates also follow the switch in actual values at around 3000 and 4800 seconds of elapsed time. However, after the switch the estimates take a while to get close to the new values. Though the Kalman filter detects and tracks the switch in parameters, the convergence of estimates to new values is quite slow. FIG. 19 illustrates a plot 1900 of the variances in service time estimation error versus elapsed time and FIG. 20 illustrates a plot 2000 of the variances in delay estimation error versus elapsed time. FIGS. 19 and 20 show the variances in estimation error that converge to low values, but exhibit a saw-tooth type increase and decrease pattern. The variances do not converge to a steady-state value and could be further improved.

Figure 21:
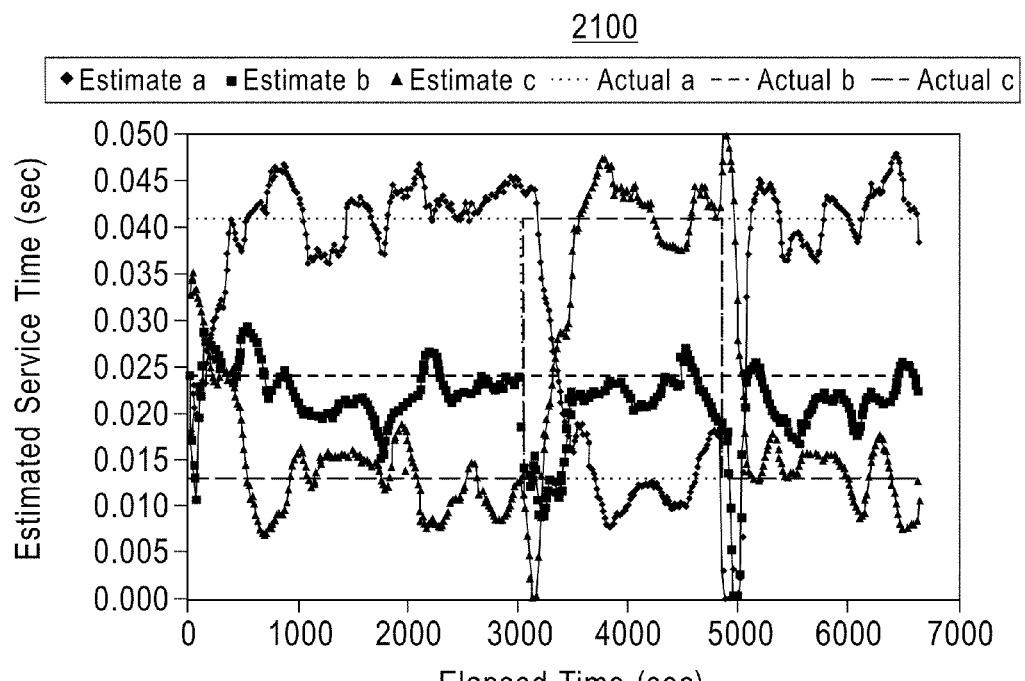
FIG. 21 illustrates a plot of estimated service time versus elapsed time for the step-change in system parameter condition using the modified EKF in accordance with exemplary embodiments.
Figure 22:
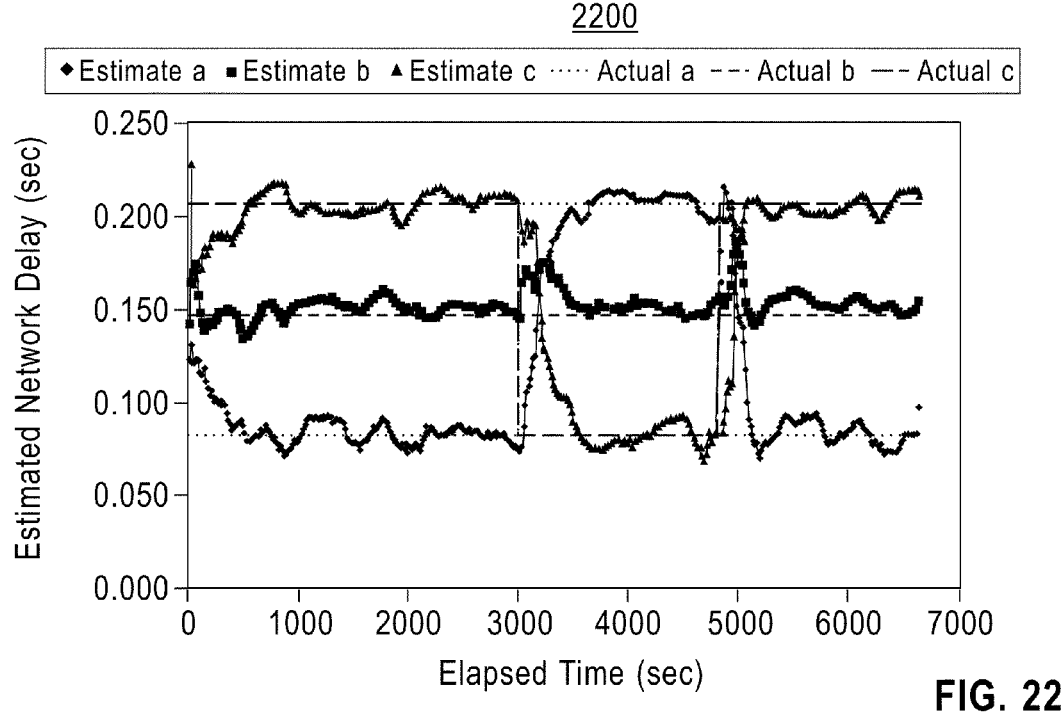
FIG. 22 illustrates a plot of estimated delay versus elapsed time for the step-change in system parameter condition using the modified EKF in accordance with exemplary embodiments.
Figure 23:
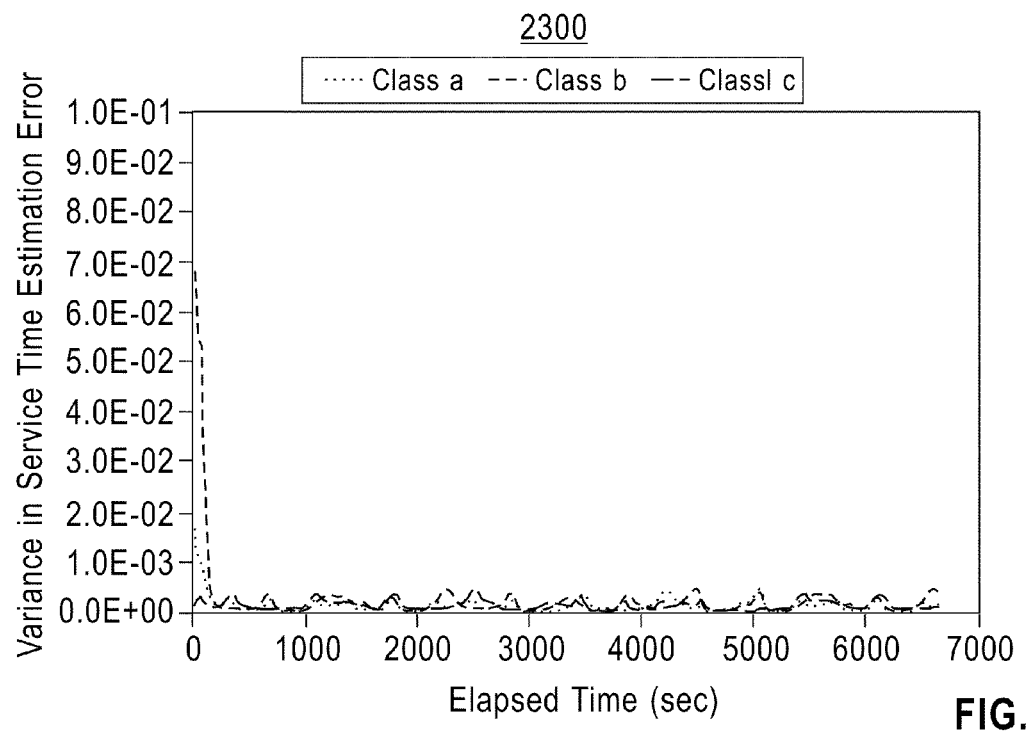
FIG. 23 illustrates a plot of variance in service time estimation error versus elapsed time in accordance with exemplary embodiments.
Figure 24:
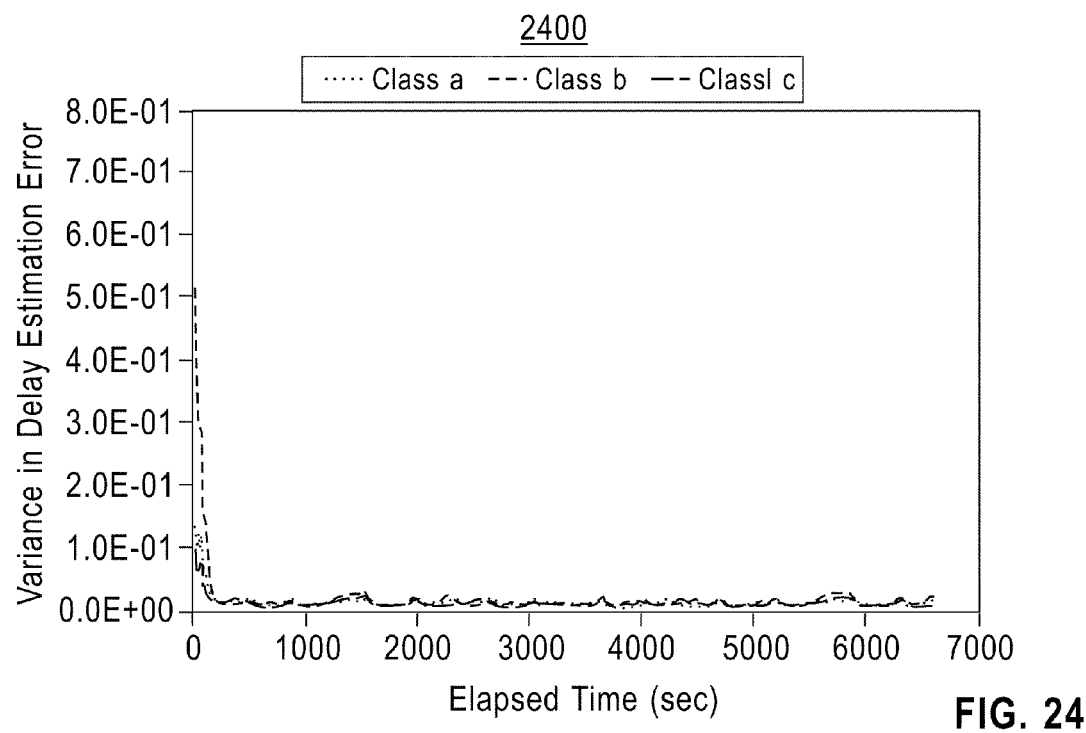
FIG. 24 illustrates a plot of variance in delay estimation error versus elapsed time in accordance with exemplary embodiments.

FIGS. 21 and 22 illustrate plots 2100, 2200 of service time versus elapsed time and delay versus elapsed time estimates for the SSP experiment using the modified EKF. N=1 additional constraint was sufficient this time since the high varying workload already contributed towards generating higher number of linearly independent set of measurements at each time step k. Service time estimates here converge to the new actual values only about 200 seconds after the 2nd switch in parameters which occurs at around 4800 seconds of elapsed time. Compare this with FIG. 17 where it takes more than around 1200 seconds. Similarly, delay estimates converge to the new actual values in only about 300 seconds in FIG. 22 as compared to more than approximately 1400 seconds in FIG. 18. Thus, for SSP experiment the order of improvement is about 4× to 6× in terms of the time to converge. FIG. 23 illustrates a plot 2300 of variance in service time estimation error versus elapsed time in accordance with exemplary embodiments and FIG. 24 illustrates a plot 2400 of variance in delay estimation error versus elapsed time in accordance with exemplary embodiments. FIGS. 23 and 24 show the quantitative improvement in terms of the variances in estimation error that converge to very low and steady-state values.

The results in Example 1 and Example 2 illustrate that the exemplary modified EKF design is effective in solving the convergence problems encountered with the original EKF design. The modified design is therefore desirable for a successful implementation of EKF for real-time performance modeling of AS systems that process multiple classes of workload.

In exemplary embodiments, high varying workload results in improved tracking of parameters. High varying workload has the possibility to generate higher number of linearly independent set of measurements at each time step k, as compared to low varying workload. The high varying workload operates to reduce the underdetermined nature of the estimation problem and eventually leads to a reduced set of feasible solutions. As such, parameter tracking is improved as illustrated in the examples herein.

Figure 25:
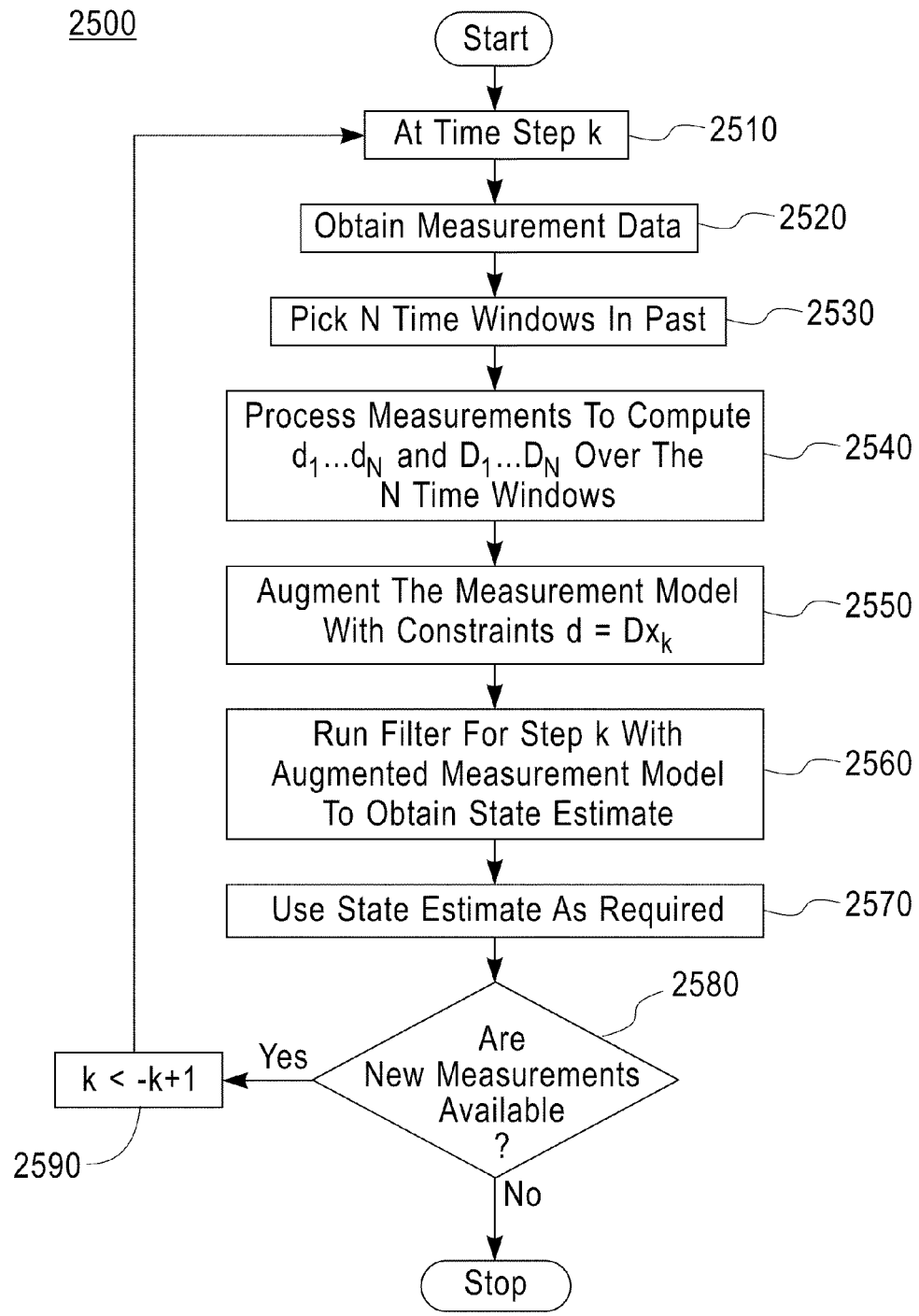
FIG. 25 illustrates a flow chart for a method for determining real-time performance models of software systems that process multi-class workloads.

The exemplary modified EKF implemented in the examples described above can be generalized as now described. FIG. 25 illustrates a flow chart for a method 2500 for determining a real-time performance model of systems that process multi-class workloads. At block 2510, the time for measurement commences at time step k. At block 2520, the system 200 obtains measurement data. At block 2530, the method 2500 selects N time windows in the past. N constraints are constructed from the N time windows that are processed to build each constraint. At block 250, the measurements are processed to compute $d_1 \ldots d_N$ and $D_1 \ldots D_N$ over the N time windows. At block 2550 the measurement model is augmented with the constraints $d=Dx_k$. At block 2560, the exemplary modified EKF is run for step k with the augmented measurement model obtained at block 2550 to obtain the state estimate. At block 2570, the state estimate is used as required. As discussed above with respect to FIGS. 10, 11, 21, 22, the actual expected values can be plotted against the estimated data calculated at 2560 to check for convergence. As further discussed above, the "goodness" of the estimates can be calculated as in FIGS. 12, 13, 23, 24. At block 2580, the method 2500 checks to see if there are additional measurements available. If there are additional measurements available at block 2580, then k is incremented and the method 2500 repeats at block 2510. If there are no additional measurements available at block 2580, then the method 2500 ends.

Figure 26:
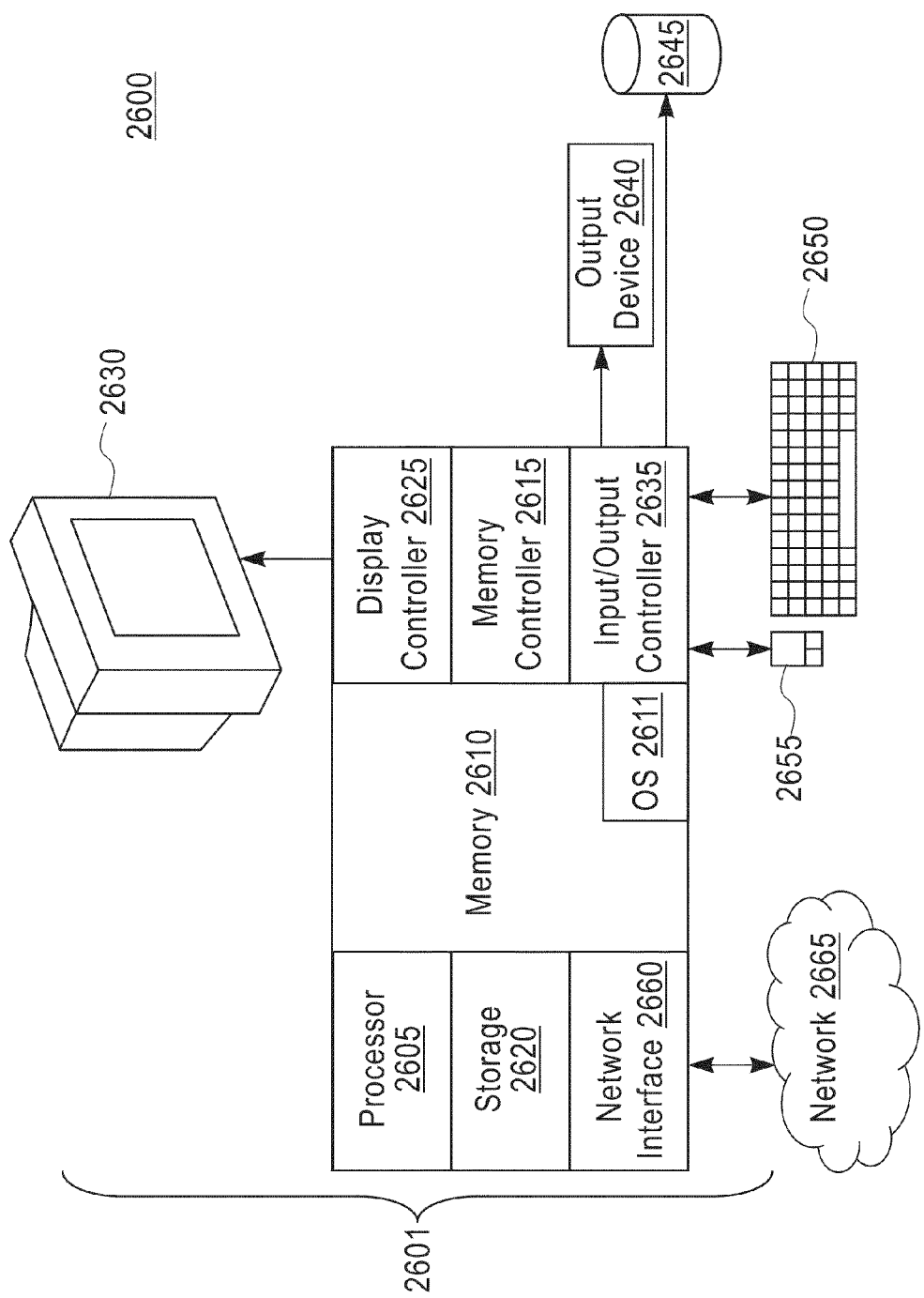
FIG. 26 illustrates an exemplary embodiment of a system that can be implemented for determining real-time performance models of software systems that process multi-class workloads.

The computer systems described herein such as the client and server machines can be any suitable computer. FIG. 26 illustrates an exemplary embodiment of a system 2600 that can be implemented for determining a real-time performance model of systems that process multi-class workloads. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 2600 therefore includes general-purpose computer 2601.

In exemplary embodiments, in terms of hardware architecture, as shown in FIG. 26, the computer 2601 includes a processor 2605, memory 2610 coupled to a memory controller 2615, and one or more input and/or output (I/O) devices 2640, 2645 (or peripherals) that are communicatively coupled via a local input/output controller 2635. The input/output controller 2635 can be, for example but not limited to, one or more buses or other wired or wireless connections, as is known in the art. The input/output controller 2635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 2605 is a hardware device for executing software, particularly that stored in memory 2610. The processor 2605 can be any custom made or commercially available processor, a central processing unit (CPU), an auxiliary processor among several processors associated with the computer 2601, a semiconductor based microprocessor (in the form of a microchip or chip set), a macroprocessor, or generally any device for executing software instructions.

The memory 2610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 2610 may incorporate electronic, magnetic, optical, and/or other types of storage media. Note that the memory 2610 can have a distributed architecture, where various components are situated remote from one another, but can be accessed by the processor 2605.

The software in memory 2610 may include one or more separate programs, each of which comprises an ordered listing of executable instructions for implementing logical functions. In the example of FIG. 26, the software in the memory 2610 includes the multi-class system's real-time performance model determination methods described herein in accordance with exemplary embodiments and a suitable operating system (OS) 2611. The operating system 2611 essentially controls the execution of other computer programs, such as the multi-class system's real-time performance model determination systems and methods described herein, and provides scheduling, input-output control, file and data management, memory management, and communication control and related services.

The multi-class system's real-time performance model determination methods described herein may be in the form of a source program, executable program (object code), script, or any other entity comprising a set of instructions to be performed. When a source program, then the program needs to be translated via a compiler, assembler, interpreter, or the like, which may or may not be included within the memory 2610, so as to operate properly in connection with the OS 2611. Furthermore, the multi-class system's real-time performance model determination methods can be written as an object oriented programming language, which has classes of data and methods, or a procedure programming language, which has routines, subroutines, and/or functions.

In exemplary embodiments, a conventional keyboard 2650 and mouse 2655 can be coupled to the input/output controller 2635. Other output devices such as the I/O devices 2640, 2645 may include input devices, for example but not limited to a printer, a scanner, microphone, and the like. Finally, the I/O devices 2640, 2645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 2600 can further include a display controller 2625 coupled to a display 2630. In exemplary embodiments, the system 2600 can further include a network interface 2660 for coupling to a network 2665. The network 2665 can be an IP-based network for communication between the computer 2601 and any external server, client and the like via a broadband connection. The network 2665 transmits and receives data between the computer 2601 and external systems. In exemplary embodiments, network 2665 can be a managed IP network administered by a service provider. The network 2665 may be implemented in a wireless fashion, e.g., using wireless protocols and technologies, such as WiFi, WiMax, etc. The network 2665 can also be a packet-switched network such as a local area network, wide area network, metropolitan area network, Internet network, or other similar type of network environment. The network 2665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 2601 is a PC, workstation, intelligent device or the like, the software in the memory 2610 may further include a basic input output system (BIOS) (omitted for simplicity). The BIOS is a set of essential software routines that initialize and test hardware at startup, start the OS 2611, and support the transfer of data among the hardware devices. The BIOS is stored in ROM so that the BIOS can be executed when the computer 2601 is activated.

When the computer 2601 is in operation, the processor 2605 is configured to execute software stored within the memory 2610, to communicate data to and from the memory 2610, and to generally control operations of the computer 2601 pursuant to the software. The multi-class system's real-time performance model determination methods described herein and the OS 2611, in whole or in part, but typically the latter, are read by the processor 2605, perhaps buffered within the processor 2605, and then executed.

When the systems and methods described herein are implemented in software, as is shown in FIG. 26, it the methods can be stored on any computer readable medium, such as storage 2620, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the multi-class system's real-time performance model determination methods are implemented in hardware, the multi-class system's real-time performance model determination methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include an augmented measurement model that improves the rate of convergence of a state estimate to its actual expected value. As such, the exemplary methods described herein achieve faster convergence of parameter estimation through an improved filter design by choosing constraints based on measurements from recent past and augmenting the measurement model with those constraints. The exemplary modified EKF as described herein can be implemented for systems that process multiple classes of workloads in which the coefficient of variation for the workload is small. In addition, the exemplary modified EKF described herein can be implemented for AS systems in which a step change in the system state parameters occurs due to adaptive reconfiguration of software. Although AS systems have been discussed in the examples, the exemplary modified EKF can be implemented for real-time performance modeling of any system including but not limited to computer networks, image processing systems, computer vision and robotic systems and wireless network systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. In a performance modeling computer having a processor, a method for real time determination of a performance model of a transaction processing system that processes multi-class workloads, the method comprising:

representing a multi-class workload processed by the transaction processing system, and represented by arrival rates, $\lambda^a$, $\lambda^b$ and $\lambda^c$, of transaction request classes, a, b and c;

representing the performance model of the transaction processing system, by a state of the s transaction processing system that includes service time, $s^a$, $s^b$, $s^c$, and network delay, $d^a$, $d^b$, $d^c$), the performance model being represented by a state vector, x, given by:

$$x = [s^a \ s^b \ s^c \ d^a \ d^b \ d^c]^T;$$

representing a measurement datum z that is at least one of gathered and sampled from the transaction processing system, by response times, $R^a$, $R^b$ and $R^c$, of a request completion and CPU utilization, u, averaged over all CPUs of the of the transaction processing system, the measurement datum z, given by:

$$z = \begin{bmatrix} R^a \\ R^b \\ R^c \\ u \end{bmatrix};$$

representing a measurement model that relates the performance model x to the measurement datum z at current time step k, by:

$$z_k = H_k x_k + v_k;$$

wherein $z_k$ is a measurement vector representing the measurement datum, z, $H_k$ is a measurement model matrix, $x_k$ is the performance model's state vector and $v_k$ is an observation noise vector;

representing a process of real-time determination of the performance model, by the process of estimation of state vector x at current time step k using measurement datum gathered at a past and a current time steps 0 to k via a modified extended Kalman filter, representing a time window by a continuous series of time steps prior to current time step k over which the measurement datum z has been gathered in the past time;

for a set of measurement data received by the processor:

collecting measurement datum $z_0$ to $z_k$ at the past and current times 0 to k;

selecting any N time windows prior to a current time step k;

processing the measurement datum $z_0$ to $z_k$ over the N time windows through a set of mathematical operations of summation and averaging to compute a new vector d;

processing a set of measurement model matrices $H_0$ to $H_k$ over the N time windows through a set of mathematical operations of summation and averaging to compute a new matrix D;

forming a set of constraints on $x_k$ using the newly computed vector d and matrix D, the set of constraints being given by:

$Dx_k = d;$ at least one of augmenting and appending the set of constraints to the measurement model to obtain an augmented measurement model given by;

$$\begin{bmatrix} z_k \\ d \end{bmatrix} = \begin{bmatrix} H_k \\ D \end{bmatrix} x_k + \begin{bmatrix} v_k \\ 0 \end{bmatrix},$$

wherein the set of constraints are augmented to the measurement model as measurements with zero noise covariance, running a modified extended Kalman filter with the augmented measurement model to obtain an estimate of the performance model's state vector $x_k$ at time step k;

incrementing the time step k.

2. The method as claimed in claim 1 where $d = [d_1 d_2 \ldots d_N]^T$ and $D = [D_1 D_2 \ldots D_N]^T,$ wherein N is the selected number of time windows and is the same as the number of constraints.

3. The method as claimed in claim 2 further comprising processing the measurement datum over N time windows each of which is of size $l_i$ sampling time steps.

4. The method as claimed in claim 3 wherein the elements of vector d re computed as $$d_i = \bar{z}_{l_i} = \frac{1}{l_i} \sum_{j=p}^{q} z_{k-j} \ \forall \ i = 1 \ldots N,$$

wherein $d_i$, i=1 to N represent elements of vector d with each $d_i$ being a vector in itself, $\bar{z}_{l_i}$ represents a mathematical operation of averaging the measurement vectors $z_{k-j}$ as shown, j is an index variable, p is the lower index limit in the summation term, q is the upper index limit in the summation term, $z_{k-j}$ is the measurement datum gathered at time step k-j, and $l_i$, i=1 to N is the size in number of time steps of each of the N time windows.

5. The method as claimed in claim 4 wherein $$p = 1 + \sum_{r=1}^{i-1} l_r$$

and $$q = \sum_{r=1}^{i} l_r.$$

wherein r is an index variable and $l_r$ is the size in number of time steps of the $r^{th}$ time window.

6. The method as claimed in claim 3 wherein elements of matrix D are computed as:

$$D_i = \bar{H}_{l_i} = \frac{1}{l_i} \sum_{j=p}^{q} H_{k-j} \ \forall \ i = 1 \ldots N,$$

wherein $D_i$, i=1 to N represent matrix elements of matrix D with each $D_i$ being a matrix in itself, $\bar{H}_{l_i}$ represents a mathematical operation of averaging the model matrices $H_{k-j}$ as shown, j is an index variable, p is the lower index limit in the summation term, q is the upper index limit in the summation term, $H_{j-k}$ is the measurement model matrix computed at time step k-j as per the extended Kalman filter operation, and $l_i$, 1 to N is the size in number of time step-s of each of the N time windows.

7. The method as claimed in claim 6 wherein $$p = 1 + \sum_{r=1}^{i-1} l_r$$

and $$q = \sum_{r=1}^{i} l_r.$$

wherein r is an index variable and $l_r$ is the size in number of time steps of the $r^{th}$ time window.

8. In a performance modeling computer having a processor, a method for real time determination of a performance model of a transaction processing system that processes multi-class workloads, the method comprising:

representing a multi-class workload processed by the transaction processing system, and represented by arrival rates, $\lambda^a, \lambda^b$ and $\lambda^c$, of transaction request classes, a, b and c;

representing the performance model of the transaction processing system, by a state of the s transaction processing system that includes service time, $s^a, s^b, s^c$, and network delay, $d^a, d^b, d^c$), the performance model being represented by a state vector, x, given by:

$x = [s^a \ s^b \ s^c \ d^a \ d^b \ d^c]^T;$ representing a measurement datum z that is at least one of gathered and sampled from the transaction processing system, by response times, $R^a, R^b$ and $R^c$, of a request completion and CPU utilization, u, averaged over all CPUs of the of the transaction processing system, the measurement datum z, given by:

$$z = \begin{bmatrix} R^a \\ R^b \\ R^c \\ u \end{bmatrix};$$

representing a measurement model that relates the performance model x to the measurement datum z at current time step k, by:

$$z_k = H_k x_k + v_k;$$

wherein $z_k$ is a measurement vector representing the measurement datum, z, $H_k$ is a measurement model matrix, $x_k$ is the performance model's state vector and $v_k$ is an observation noise vector;

representing a process of real-time determination of the performance model, by the process of estimation of state vector x at current time step k using measurement datum gathered at a past and a current time steps 0 to k via a modified extended Kalman filter, representing a time window by a continuous series of time steps prior to current time step k over which the measurement datum z has been gathered in the past time;

for a set of measurement data received by the processor:
  collecting measurement datum $z_0$ to $z_k$ at the past and current times 0 to k:
  selecting any N time windows prior to a current time step k;
  processing the measurement datum $z_0$ to $z_k$ over the N time windows through a set of mathematical operations of summation and averaging to compute a new vector d;
  processing a set of measurement model matrices $H_0$ to $H_k$ over the N time windows through a set of mathematical operations of summation and averaging to compute a new matrix D;
  forming a set of constraints on $x_k$ using the newly computed vector d and matrix D, the set of constraints being given by:

$$Dx_k = d;$$

at least one of augmenting and appending the set of constraints to the measurement model to obtain an augmented measurement model given by;

$$\begin{bmatrix} z_k \\ d \end{bmatrix} = \begin{bmatrix} H_k \\ D \end{bmatrix} x_k + \begin{bmatrix} v_k \\ e_k \end{bmatrix},$$

where $e_k$ is a noise vector,
wherein the set of constraints are augmented to the measurement model as measurements with zero noise covariance,
  running a modified extended Kalman filter with the augmented measurement model to obtain an estimate of the performance model's state vector $x_k$ at time step k;
  incrementing the time step k.

9. The method as claimed in claim 8 where $$d = [d_1 d_2 \ldots d_N]^T \text{ and } D = [D_1 D_2 \ldots D_N]^T,$$

wherein N is the selected number of time windows and is the same as number of constraints.

10. The method as claimed in claim 9 further comprising processing the measurement datum over N time windows each of which is of size $l_i$ sampling time steps.

11. The method as claimed in claim 10 wherein the elements of vector d re computed as $$d_i = \bar{z}_{l_i} = \frac{1}{l_i} \sum_{j=p}^{q} z_{k-j} \quad \forall\, i = 1 \ldots N,$$

wherein $d_i$, i=1 to N represent elements of vector d with each $d_i$ being a vector in itself, $\bar{z}_{l_i}$ represents a mathematical operation of averaging the measurement vectors $z_{k-j}$ as shown, j is an index variable, p is the lower index limit in the summation term, q is the upper index limit in the summation term, $z_{k-j}$ is the measurement datum gathered at time step k-j, and $l_i$, i+1 to N is the size in number of time steps of each of the N time windows.

12. The method as claimed in claim 11 wherein $$p = 1 + \sum_{r=1}^{i-1} l_r \text{ and } q = \sum_{r=1}^{i} l_r,$$

wherein r is an index variable and $l_r$ is the size in number of time steps of the $r^{th}$ time window.

13. The method as claimed in claim 10 wherein elements of matrix D are computed as:

$$D_i = \bar{H}_{l_i} = \frac{1}{l_i} \sum_{j=p}^{q} H_{k-j} \quad \forall\, i = 1 \ldots N,$$

wherein $D_i$, i=1 to N represent matrix elements of matrix D with each $D_1$ being a matrix in itself, $\bar{H}_{l_i}$ represents a mathematical operation of averaging the model matrices $H_{j-k}$ as shown, j is an index variable, p is the lower index limit in the summation term, q is the upper index limit in the summation term, $H_{k-j}$ is the measurement model matrix computed at time step k-j as per the extended Kalman filter operation, and $l_i$, i=1 to N is the size in number of time steps of each of the N time windows.

14. The method as claimed in claim 13 wherein $$p = 1 + \sum_{r=1}^{i-1} l_r \text{ and } q = \sum_{r=1}^{i} l_r,$$

wherein r is an index variable and $l_r$ is the size in number of time steps of the $r^{th}$ time window.

* * * * *